US012763836B2

(12) United States Patent
Timo et al.

(10) Patent No.: US 12,763,836 B2
(45) Date of Patent: Oct. 13, 2026

(54) COMBINING PROPRIETARY AND STANDARDIZED TECHNIQUES FOR CHANNEL STATE INFORMATION (CSI) FEEDBACK

(71) Applicant: Telefonaktiebolaget LM Ericsson (publ), Stockholm (SE)

(72) Inventors: Roy Timo, Kungsängen (SE); Mattias Frenne, Uppsala (SE); Rakesh Ranjan, Järfälla (SE); Xinlin Zhang, Västra Frölunda (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 424 days.

(21) Appl. No.: 18/569,006

(22) PCT Filed: Jun. 27, 2022

(86) PCT No.: PCT/EP2022/067511
§ 371 (c)(1),
(2) Date: Dec. 11, 2023

(87) PCT Pub. No.: WO2023/274926
PCT Pub. Date: Jan. 5, 2023

(65) Prior Publication Data

US 2024/0283509 A1 Aug. 22, 2024

Related U.S. Application Data

(60) Provisional application No. 63/215,743, filed on Jun. 28, 2021.

(51) Int. Cl.
*H04L 5/00* (2006.01)
*H04B 7/0452* (2017.01)
(Continued)

(52) U.S. Cl.
CPC ......... *H04B 7/0626* (2013.01); *H04B 7/0452* (2013.01); *H04B 7/0617* (2013.01); *H04W 24/02* (2013.01)

(58) Field of Classification Search
CPC ... H04B 7/0417; H04L 5/0094; H04L 5/0016; H04L 5/0023; H04L 5/0051
See application file for complete search history.

(56) References Cited

U.S. PATENT DOCUMENTS

2015/0365154 A1* 12/2015 Davydov .............. H04W 72/23 370/329
2021/0250850 A1* 8/2021 Huang .................. H04W 48/16
2021/0273706 A1* 9/2021 Zeng ...................... G06N 3/088

FOREIGN PATENT DOCUMENTS

WO 2020180221 A1 9/2020
WO 2021112732 A1 6/2021
WO 2022220716 A1 10/2022

OTHER PUBLICATIONS

"Study on AI/ML based air interface enhancement in Rel 18", 3GPP TSG RAN Rel-18 workshop, RWS 210170, Electronic Meeting, Jun. 28-Jul. 2, 2021, pp. 1-21.
(Continued)

*Primary Examiner* — Anez C Ebrahim
(74) *Attorney, Agent, or Firm* — Murphy, Bilak & Homiller, PLLC

(57) ABSTRACT

Embodiments include methods for a radio access network (RAN) node configured to serve one or more user equipment (UEs). Such methods include transmitting reference signals (RS) for a downlink (DL) channel and receiving, from a UE, a report including encoded feedback representing the DL channel. The encoded feedback comprises a UE DL channel estimate mapped to a channel feature set based on a first mapping that is proprietary to the UE. The channel feature set is compressed based on a second mapping that is known
(Continued)

by the UE and the RAN node. Such methods also include, using a decoder function of a neural-network autoencoder (NNAE), decoding the encoded feedback to obtain a reconstruction of the channel feature set. Other embodiments include complementary methods for a UE, as well as RAN nodes and UEs configured to perform such methods.

20 Claims, 11 Drawing Sheets

(51) Int. Cl.
*H04B 7/06* (2006.01)
*H04W 24/02* (2009.01)

(56) References Cited

OTHER PUBLICATIONS

"3GPP TS 38.214 V16.0.0", 3rd Generation Partnership Project; Technical Specification Group Radio Access Network; NR; Physical layer procedures for data (Release 16), Dec. 2019, pp. 1-147.

"3GPP TS 38.214 V16.5.0", 3rd Generation Partnership Project; Technical Specification Group Radio Access Network; NR; Physical layer procedures for data (Release 16), Mar. 2021, pp. 1-171.

* cited by examiner

COMBINING PROPRIETARY AND STANDARDIZED TECHNIQUES FOR CHANNEL STATE INFORMATION (CSI) FEEDBACK

TECHNICAL FIELD

The present disclosure relates generally to wireless networks, and more specifically to techniques for training network-based decoders of user equipment (UE)-encoded feedback about a downlink (DL) channel from a wireless network to the UE, such as when the network decoder and/or UE encoder use artificial intelligence (AI) and/or machine learning (ML) techniques.

BACKGROUND

Long-Term Evolution (LTE) is an umbrella term for so-called fourth-generation (4G) radio access technologies developed within the Third-Generation Partnership Project (3GPP) and initially standardized in Release 8 (Rel-8) and Release 9 (Rel-9), also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases.

Currently the fifth generation ("5G") of cellular systems, also referred to as New Radio (NR), is being standardized within the Third-Generation Partnership Project (3GPP). NR is developed for maximum flexibility to support multiple and substantially different use cases. These include enhanced mobile broadband (eMBB), machine type communications (MTC), ultra-reliable low latency communications (URLLC), side-link device-to-device (D2D), and several other use cases. NR was initially specified in 3GPP Release 15 (Rel-15) and continues to evolve through subsequent releases, such as Rel-16 and Rel-17.

5G/NR technology shares many similarities with LTE. For example, NR uses CP-OFDM (Cyclic Prefix Orthogonal Frequency Division Multiplexing) in the downlink (DL) from network to user equipment (UE), and both CP-OFDM and DFT-spread OFDM (DFT-S-OFDM) in the uplink (UL) from UE to network. As another example, NR DL and UL time-domain physical resources are organized into equal-sized 1-ms subframes. A subframe is further divided into multiple slots of equal duration, with each slot including multiple OFDM-based symbols. However, time-frequency resources can be configured much more flexibly for an NR cell than for an LTE cell. For example, rather than a fixed 15-kHz OFDM sub-carrier spacing (SCS) as in LTE, NR SCS can range from 15 to 240 kHz, with even greater SCS considered for future NR releases.

In addition to providing coverage via cells as in LTE, NR networks also provide coverage via "beams." In general, a DL (DL, i.e., network to UE) "beam" is a coverage area of a network-transmitted reference signal (RS) that may be measured or monitored by a UE. In NR, for example, RS can include any of the following: synchronization signal/PBCH block (SSB), channel state information RS (CSI-RS), tertiary reference signals (or any other sync signal), positioning RS (PRS), demodulation RS (DMRS), phase-tracking reference signals (PTRS), etc. In general, SSB is available to all UEs regardless of the state of their connection with the network, while other RS (e.g., CSI-RS, DM-RS, PTRS) are associated with specific UEs that have a network connection.

5G/NR networks are expected to operate at higher frequencies such as 5-60 GHz, which are typically referred to as "millimeter wave" or "mmW" for short. Such systems are also expected to utilize a variety of multi-antenna technology (e.g., antenna arrays) at the transmitter, the receiver, or both. In general, multi-antenna technology can include a plurality of antennas in combination with advanced signal processing techniques (e.g., beamforming). Multi-antenna technology can be used to improve various aspects of a communication system, including system capacity (e.g., more users per unit bandwidth per unit area), coverage (e.g., larger area for given bandwidth and number of users), and increased per-user data rate (e.g., for given bandwidth and area).

Availability of multiple antennas at the transmitter and/or the receiver can be utilized in different ways to achieve different goals. For example, multiple antennas at the transmitter and/or the receiver can be used to provide additional diversity against radio channel fading. To achieve such diversity, the channels experienced by the different antennas should have low mutual correlation, e.g., a sufficiently large antenna spacing ("spatial diversity") and/or different polarization directions ("polarization diversity").

As another example, multiple antennas at the transmitter and/or the receiver can be used to shape or "form" the overall antenna beam (e.g., transmit and/or receive beam, respectively) in a certain way, with the general goal being to improve the received signal-to-interference-plus-noise ratio (SINR) and, ultimately, system capacity and/or coverage. This can be done, for example, by maximizing the overall antenna gain in the direction of the target receiver or transmitter or by suppressing specific dominant interfering signals. More specifically, the transmitter and/or receiver can determine an appropriate weight for each antenna element in an antenna array so as to produce one or more beams, with each beam covering a particular range of azimuth and elevation relative to the antenna array.

In relatively good channel conditions, the capacity of the channel becomes saturated such that further improving the SINR provides limited capacity improvements. In such cases, using multiple antennas at both the transmitter and the receiver can be used to create multiple parallel communication "channels" over the radio interface. This can facilitate a highly efficient utilization of both the available transmit power and the available bandwidth resulting in, e.g., very high data rates within a limited bandwidth without a disproportionate degradation in coverage. For example, under certain conditions, the channel capacity can increase linearly with the number of antennas and avoid saturation in the data capacity and/or rates. These techniques are commonly referred to as "spatial multiplexing" or multiple-input, multiple-output (MIMO) antenna processing.

Accordingly, spatial multiplexing is a key feature to increase the spectral efficiency of wireless networks, including 5G/NR. Transmitting multiple layers on the same time-frequency resource can increase the data-rate for a single user (referred to as "SU-MIMO"). Alternatively, transmitting multiple layers on the same time-frequency resource to multiple users (referred to as "MU-MIMO") can increase the system capacity in terms of number of users.

More specifically, a multi-antenna radio access network (RAN) node (e.g., base station) with $N_{TX}$ antenna ports simultaneously transmits information to several UEs using the same OFDM time-frequency resources. Before modulation and transmission, a precoding matrix $$W_V^{(j)}$$

is applied to sequence $\hat{S}^{(i)}$ transmitted to user (or UE) i for spatial separation from other transmissions and mitigation of multiplexing interference. Each UE(i) demodulates its received signal and combines receiver antenna signals in order to obtain an estimate $\hat{S}^{(i)}$ of sequence S) transmitted to it. In general, the precoder $$W_V^{(i)}$$

should correlate well with channel HG observed by UE(i) and it should correlate poorly with the channels observed by other UEs.

To construct precoders that enable efficient MU-MIMO transmissions, the RAN node needs to acquire detailed knowledge of the DL channels H(i). In deployments where channel reciprocity holds, detailed channel knowledge can be acquired from UL sounding reference signals (SRS) that are transmitted periodically, or on demand, by active UEs. Based on these SRS, the RAN node can directly estimate the UL channel and, therefore, the DL channel $H^{(i)}$.

However, the RAN node cannot always accurately estimate the DL channel from UL SRS. In such cases, active UEs need to feedback channel information to the RAN node. In LTE and NR, a RAN node periodically transmits DL CSI-RS from which the UE estimates the DL channel. The UE reports CSI feedback to the RAN node over an UL channel, e.g., physical UL control channel (PUCCH) or physical UL shared channel (PUSCH). The RAN node uses the UE's feedback to select suitable precoders for DL MU-MIMO transmissions. The CSI feedback mechanism from the UE to the RAN node or network targeting MU-MIMO operations in NR is referred to as CSI Type II reporting.

SUMMARY

Recently neural network based autoencoders (NNAEs) have shown promising results for compressing DL channel estimates for UL feedback by the UE. An AE is a type of artificial neural network (NN) that can be used to compress data in an unsupervised manner. These networks are trained to compress and reconstruct data (e.g., channel estimates) with high fidelity.

For various reasons, NNAE-based CSI feedback is of interest for 3GPP Rel-18 and beyond. However, there are various problems, issues, and/or difficulties with NNAE-based CSI feedback, particularly in networks having equipment from multiple vendors or suppliers (referred to as "multi-vendor" or "open" networks).

Embodiments of the present disclosure provide specific improvements to NNAE-based CSI feedback in a wireless network, such as by providing, enabling, and/or facilitating solutions to overcome exemplary problems summarized above and described in more detail below.

Embodiments include methods (e.g., procedures) for a radio access network (RAN) node (e.g., base station, eNB, gNB, ng-eNB, etc. or component thereof) configured to serve one or more UEs in the RAN.

These exemplary methods can include transmitting reference signals (e.g., CSI-RS) for a DL channel. These exemplary methods can also include receiving, from a UE, a report including encoded feedback representing the DL channel. The encoded feedback comprises a UE DL channel estimate mapped to a channel feature set based on a first mapping that is proprietary to the UE, with the channel feature set being compressed based on a second mapping that is known by the UE and the RAN node (e.g., standardized). These exemplary methods can also include, using a decoder function of a neural-network autoencoder (NNAE), decoding the encoded feedback to obtain a reconstruction of the channel feature set.

In some embodiments, these exemplary methods can also include performing a multi-user MIMO DL transmission using a precoder selected based on the reconstruction of the channel feature set.

In some embodiments, the second mapping can be an encoder function of the NNAE, e.g., that is compatible with the decoder function. In some embodiments, the decoder function is proprietary to the RAN node. In some embodiments, these exemplary methods can also include training the decoder function based on the second mapping and a loss function that is proprietary to the RAN node.

In some embodiments, the second mapping is one of a plurality of available second mappings (e.g., corresponding to a plurality of encoder functions and/or a plurality of NNAEs). In some of these embodiments, these exemplary methods can also include receiving from the UE a first indication of a UE selection of the second mapping (i.e., from the available second mappings).

In other of these embodiments, these exemplary methods can also include sending to the UE a first indication of a RAN node selection of the second mapping (i.e., from the available second mappings). In some of these embodiments, these exemplary methods can also include receiving from the UE a further indication of the plurality of available second mappings. In such embodiments, the first indication of the RAN node selection is sent in response to the further indication.

In some of these embodiments, the plurality of available second mappings can differ with respect to one or more of the following: UE mobility, number of antennas and/or RS ports used by the UE, beamforming of RS ports by the UE, and UE antenna configuration.

In some embodiments, these exemplary methods can also include sending, to the UE, a second indication of whether the first mapping is enabled or disabled. In some of these embodiments, when the second indication indicates that the first mapping is disabled, the UE DL channel estimate is mapped to the first channel feature set based on a default mapping that is known by the UE and the RAN node.

In some embodiments, the channel feature set can include one or more of the following: Doppler power spectrum of the DL channel, and dominant delays of DL channel.

In other embodiments, the channel feature set can include a representation of a subspace of a plurality of Discrete Fourier Transform (DFT) vectors that correspond to a respective plurality of beams transmitted by the RAN node. In some of these embodiments, the representation of the subspace comprises one or more of the following: Doppler power spectrum of the subspace, and dominant delays of the subspace.

Other embodiments include methods (e.g., procedures) for a UE configured to communicate with a RAN node.

These exemplary methods can include determining a DL channel estimate based on UE measurements of DL RS transmitted by a RAN node. These exemplary methods can also include mapping the DL channel estimate to a channel feature set based on a first mapping that is proprietary to the UE. These exemplary methods can also include compressing the channel feature set based on a second mapping that is known by the UE and the RAN node. These exemplary methods can also include sending to the RAN node a report including encoded feedback representing the DL channel, wherein the encoded feedback includes the compressed channel feature set.

In some embodiments, the DL channel estimate is determined based on receiving the DL RS via a plurality of UE antennas and these exemplary methods can also include receiving, from the RAN node via the plurality of UE antennas, a multi-user MIMO DL transmission that was pre-coded based on a reconstruction of the channel feature set.

In some embodiments, the second mapping can be an encoder function of the NNAE. In some embodiments, the decoder function of the NNAE (e.g., at the RAN node) is proprietary to the RAN node. In some embodiments, these exemplary methods can also include training the encoder function based on a loss function that is proprietary to the UE.

In some embodiments, the second mapping is one of a plurality of available second mappings (e.g., corresponding to a plurality of encoder functions and/or a plurality of NNAEs). In some of these embodiments, these exemplary methods can also include sending to the RAN node a first indication of a UE selection of the second mapping (i.e., from the available second mappings).

In other of these embodiments, these exemplary methods can also include receiving from the RAN node a first indication of a RAN node selection of the second mapping (i.e., from the available second mappings). In some of these embodiments, these exemplary methods can also include sending to the RAN node a further indication of the plurality of available second mappings. In such embodiments, the first indication of the RAN node selection is received in response to the further indication.

In some of these embodiments, the plurality of available second mappings can differ with respect to one or more of the following: UE mobility, number of antennas and/or RS ports used by the UE, beamforming of RS ports by the UE, and UE antenna configuration.

In some embodiments, these exemplary methods can also include receiving, from the RAN node, a second indication of whether the first mapping is enabled or disabled. In some of these embodiments, mapping the DL channel estimate to the channel feature set based on the first mapping is responsive to the second indication indicating that the first mapping is enabled. Additionally, these exemplary methods can also include, when the second indication indicates that the first mapping is disabled, mapping the DL channel estimate to the channel feature set based on a default mapping that is known by the UE and the RAN node.

In some embodiments, the channel feature set can include one or more of the following: Doppler power spectrum of the DL channel, and dominant delays of DL channel.

In other embodiments, the channel feature set can include a representation of a subspace of a plurality of DFT vectors that correspond to a respective plurality of beams transmitted by the RAN node. In some of these embodiments, the representation of the subspace comprises one or more of the following: Doppler power spectrum of the subspace, and dominant delays of the subspace.

Other embodiments include RAN nodes (e.g., base stations, eNBs, gNBs, ng-eNBs, etc., or components thereof) and UEs (e.g., wireless devices, IoT devices, etc., or components thereof) configured to perform operations corresponding to any of the exemplary methods described herein. Other embodiments include non-transitory, computer-readable media storing program instructions that, when executed by processing circuitry, configure such RAN nodes or UEs to perform operations corresponding to any of the exemplary methods described herein.

These and other embodiments can facilitate proprietary enhancements to channel information compression by UE vendors and/or UE chipset vendors, as well as proprietary enhancements to channel information decompression by the network. At the same time, embodiments can provide a standardized, ML-based CSI reporting solution that can work in a multi-vendor 3GPP system. At a high level, embodiments can include desirable aspects of both proprietary and standardized approaches while avoiding and/or reducing the undesirable aspects of both approaches. Due to these advantages, embodiments can improve the overall performance of MU-MIMO used to transmit DL data to multiple UEs concurrently.

These and other objects, features, and advantages of embodiments of the present disclosure will become apparent upon reading the following Detailed Description in view of the Drawings briefly described below.

DETAILED DESCRIPTION

Figure 1:
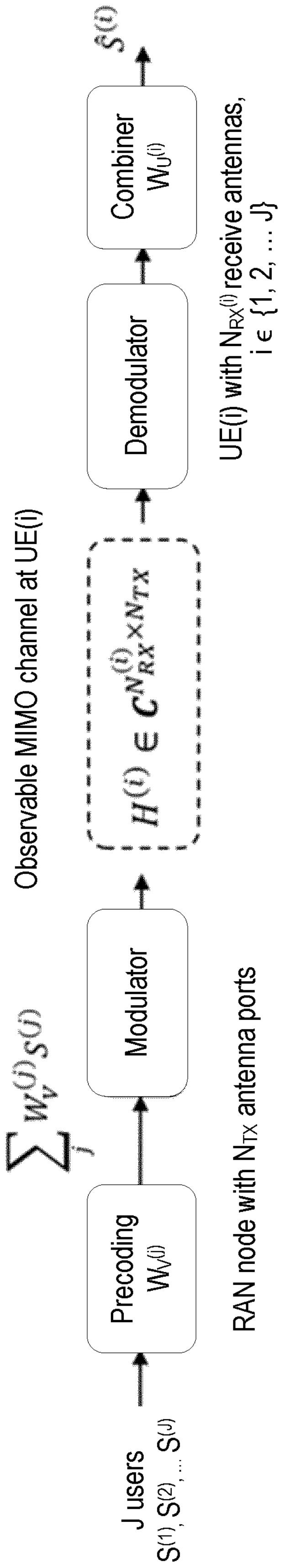
FIG. 1 shows a block diagram of an exemplary MU-MIMO arrangement.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where a step must necessarily follow or precede another step due to some dependency. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Furthermore, the following terms are used throughout the description given below:

- Radio Node: As used herein, a "radio node" can be either a radio access node or a wireless device."
- Node: As used herein, a "node" can be a network node or a wireless device.
- Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), base station distributed components (e.g., CU and DU), a high-power or macro base station, a low-power base station (e.g., micro, pico, femto, or home base station, or the like), an integrated access backhaul (IAB) node, a transmission point, a remote radio unit (RRU or RRH), and a relay node.
- Core Network Node: As used herein, a "core network node" is any type of node in a core network. Some examples of a core network node include, e.g., a Mobility Management Entity (MME), a serving gateway (SGW), a Packet Data Network Gateway (P-GW), an access and mobility management function (AMF), a session management function (AMF), a user plane function (UPF), a Service Capability Exposure Function (SCEF), or the like.
- Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Some examples of a wireless device include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc. Unless otherwise noted, the term "wireless device" is used interchangeably herein with the term "user equipment" (or "UE" for short).
- Network Node: As used herein, a "network node" is any node that is either part of the radio access network (e.g., a radio access node or equivalent name discussed above) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the description herein focuses on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR) beams may be used instead of cells and, as such, concepts described herein apply equally to both cells and beams.

The description herein may refer to scenarios where a first entity (e.g., UE) sends signals, data, or information "to" a second entity (e.g., base station), or receives signals, data, or information "from" a second entity. The use of "to" and "from" in this context does not preclude the signals, data, or information being passed through and/or forwarded by one or more other entities intermediate between the first and second entities, unless direct communication between the first and second entities is expressly stated or clearly implied by a particular context.

As briefly mentioned above, NNAE-based CSI feedback by UEs is of interest for 3GPP Rel-18 and beyond to support MU-MIMO DL transmissions by networks. However, there are various problems, issues, and/or difficulties with AE-based CSI feedback solutions, particularly in networks having equipment from multiple vendors or suppliers (referred to as "multi-vendor" or "open" networks). This is discussed in more detail below.

FIG. 1 shows a block diagram of an exemplary MU-MIMO transmission arrangement. a multi-antenna RAN node (e.g., base station) with $N_{TX}$ antenna ports simultaneously transmits information to several UEs using the same OFDM time-frequency resources. For example, sequence $S^{(1)}$ is transmitted to UE(1), $S^{(2)}$ is transmitted to UE(2), and so on. Before modulation and transmission, a precoding matrix $$W_V^{(j)}$$

is applied to sequence $S^{(i)}$ transmitted to user (or UE) i for spatial separation from other transmissions and mitigation of multiplexing interference.

Each UE(i) demodulates its received signal and combines receiver antenna signals in order to obtain an estimate $\hat{S}^{(i)}$ of sequence $S^{(i)}$ transmitted to it. Note the order of modulation and precoding, or demodulation and combining respectively, may differ from FIG. 1 depending on the specific implementation of MU-MIMO transmission. In general, the precoder $$W_V^{(i)}$$

should correlate well with channel HG observed by UE(i) and it should correlate poorly with the channels observed by other UEs. This estimate $\hat{S}^{(i)}$ can be expressed as:

$$\hat{S}^{(i)} = \underbrace{W_U^{(i)} H^{(i)} W_V^{(i)}}_{\approx I} S^{(i)} + W_U^{(i)} H^{(i)} \sum_{j,j\neq i} W_V^{(j)} S^{(j)}$$

The second term represents the spatial multiplexing interference seen by UE(i). The goal for the RAN node is to construct the set of precoders $$\{W_V^{(j)}\}$$

to meet one or more targets, such as to make:

the norm $$\|H^{(i)} W_V^{(i)}\|$$

large, since this norm represents the desired channel gain towards user i); and the norm $$\|H^{(j)} W_V^{(i)}\|,\ j \neq i$$

small, since this norm represents the interference of user is transmission received by user j.

In other words, the precoder $$W_V^{(i)}$$

should correlate well with the channel $H^{(i)}$ observed by UE(i) while correlating poorly with the channels observed by other UEs.

To construct precoders that enable efficient MU-MIMO transmissions, the RAN node needs to acquire detailed knowledge of the DL channels H(i). In deployments where reciprocity exists between UL and DL channels, detailed channel knowledge can be acquired from UL SRS that are transmitted periodically, or on demand, by active UEs. Based on these SRS, the RAN node can directly estimate the UL channel and, therefore, the DL channel $H^{(i)}$ by reciprocity.

However, the RAN node cannot always accurately estimate the DL channel from UL reference signals. For example, in frequency division duplex (FDD) deployments, the UL and DL channels use different carriers and, therefore, the UL channel might not provide enough information about the DL channel to enable MU-MIMO precoding. Additionally, the RAN node may only be able to estimate part of the UL channel. For example, the UE has fewer TX branches than RX branches, in which case only certain columns of the precoding matrix can be estimated using UL SRS.

If the RAN node cannot estimate the DL channel from UL transmissions, then active UEs need to feedback channel information to the RAN node. In LTE and NR, a RAN node periodically transmits DL CSI-RS from which the UE estimates the DL channel. The UE reports CSI feedback to the RAN node over an UL channel, e.g., physical UL control channel (PUCCH) or physical UL shared channel (PUSCH). The RAN node uses the UE's feedback to select suitable precoders for DL MU-MIMO transmissions. The CSI feedback mechanism from the UE to the RAN node or network targeting MU-MIMO operations in NR is referred to as CSI Type II reporting.

Figure 2:
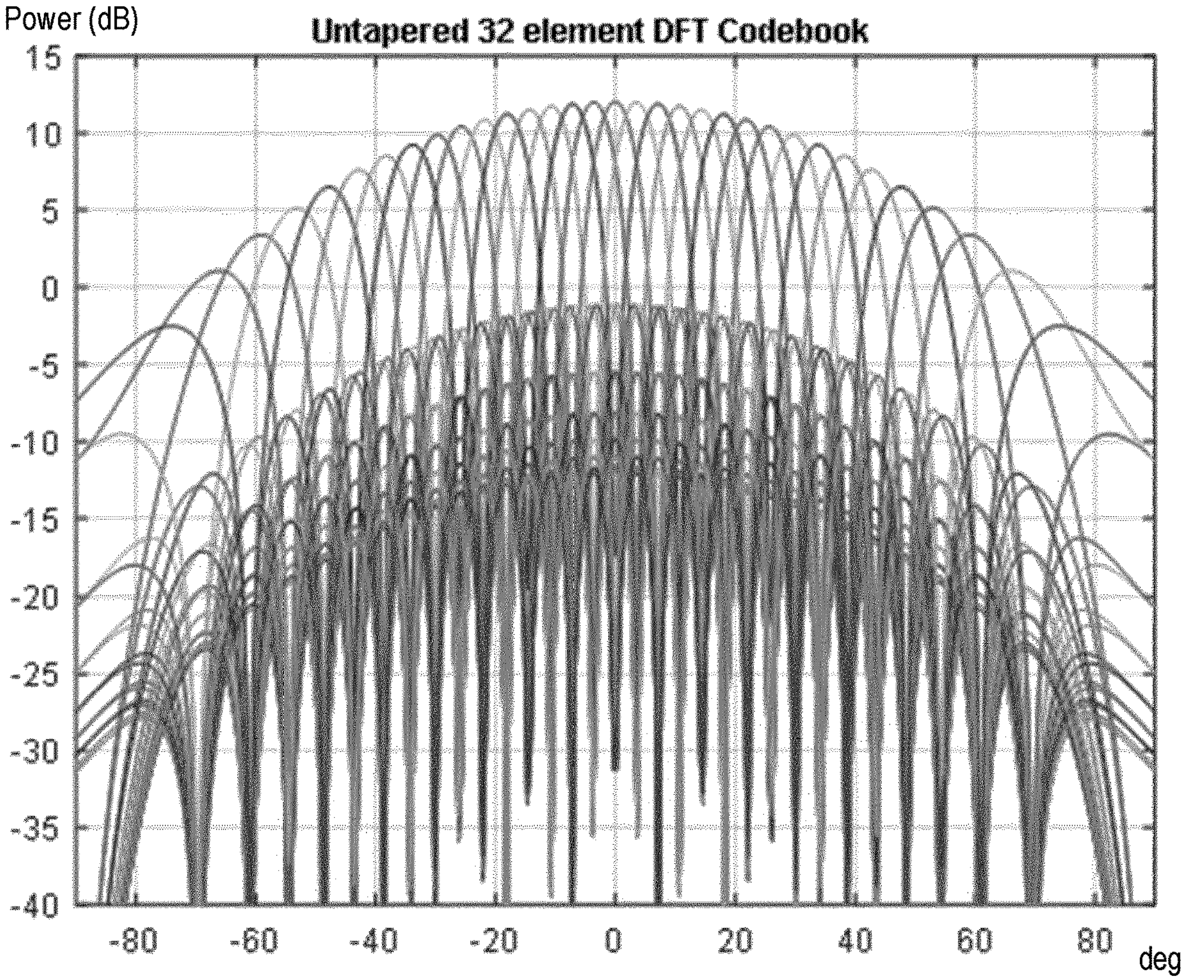
FIG. 2 shows beams of a 32-vector DFT beamforming codebook covering an orientation range of +/−90 degrees.

Normal Type II CSI reporting is based on the specification of sets of DFT basis functions (also referred to as "grid of beams") in a precoder codebook. In general, the DFT basis functions (or vectors) provide a set of beams equally spaced in orientation over a range of interest. This arrangement provides the narrowest beam and also full utilization of power amplifiers (PAs), but at the expense of high sidelobes. FIG. 2 illustrates the grid of beams for a 32-element DFT codebook covering an azimuth range of +/−90 degrees, where the maximum sidelobe for each beam is 13 dB below the peak for that beam.

The UE selects and reports the L DFT vectors from the codebook that best match its channel conditions. This approach is similar to precoding matrix indicator (PMI) from earlier 3GPP releases. The number L is configurable but is typically 2 or 4. The UE also reports how the L DFT vectors should be combined in terms of relative amplitude scaling and co-phasing. In general, each DFT vector corresponds to a beam, particularly when the RAN node has a uniform planar array with antenna elements separated by less than half of the carrier wavelength. Based on this technical context, the terms "DFT vector" and "beam" are used synonymously herein unless expressly stated otherwise or a different meaning is clear from a particular context of use.

Figure 3:
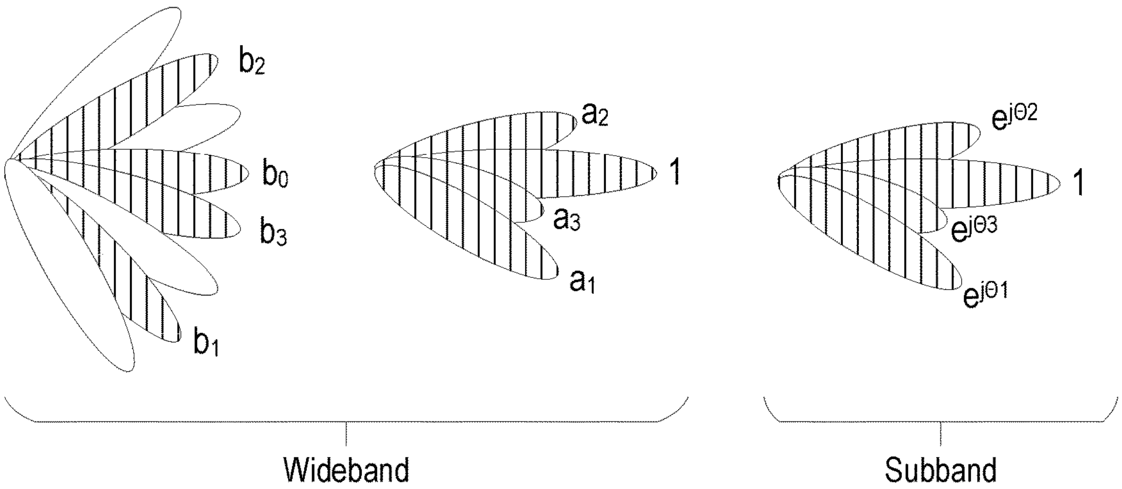
FIG. 3 illustrates type II CSI feedback, as further described in 3GPP TS 38.214 (v16.5.0).

FIG. 3 illustrates CSI type II feedback mode, which is further described in 3GPP TS 38.214 (v16.5.0). The selection and reporting of the L DFT beam vectors $b_n$ and their relative amplitudes $a_n$ is done in a wideband manner, i.e., the same beams are used for both polarizations over the whole band. However, the selection and reporting of the beam co-phasing coefficients is done in a sub-band manner, i.e., co-phasing parameters are determined for each of multiple subsets of contiguous subcarriers. The co-phasing parameters are quantized such that $e^{j\theta_n}$ is taken from either a QPSK or 8PSK signal constellation. With k denoting a sub-band index, the precoder reported by the UE can be expressed as:

$$W_V[k] = \sum_n b_n a_n e^{j\theta_n[k]}.$$

The Type II CSI report can be used by the RAN node to spatially co-schedule multiple UEs on the same OFDM time-frequency resources. For example, the RAN node can select UEs that have reported different sets of beams or beams that have weak correlations. The CSI Type II report enables the UE to report a precoder hypothesis that trades CSI resolution for reduced UL transmission overhead.

NR Rel-15 also supports Type II CSI feedback using port selection. In this case, the RAN node transmits a CSI-RS port in each direction but the UE does not use a codebook to select a DFT vector (or beam). Instead, the UE selects one or multiple antenna ports from the CSI-RS resource of multiple ports. Type II CSI feedback using port selection gives the RAN node some flexibility to use non-standardized precoders, which are transparent to the UE.

For the port-selection codebook, the precoder reported by the UE can be described as:

$$W_V[k] = \sum_n e_n a_n e^{j\theta_n[k]}.$$

where e is a unit vector with only one non-zero element and can be viewed a "selection vector" that selects a port from the set of ports in the measured CSI-RS resource. The UE thus feeds back which ports it has selected, the amplitude factors, and the co-phasing factors.

Recently NNAEs have shown promising results for compressing DL channel estimates for UL feedback by the UE. As briefly mentioned above, an NNAE is a type of artificial NN that can be used to compress data in an unsupervised manner. These networks are trained to compress and reconstruct data (e.g., channel estimates) with high fidelity.

Figure 4:
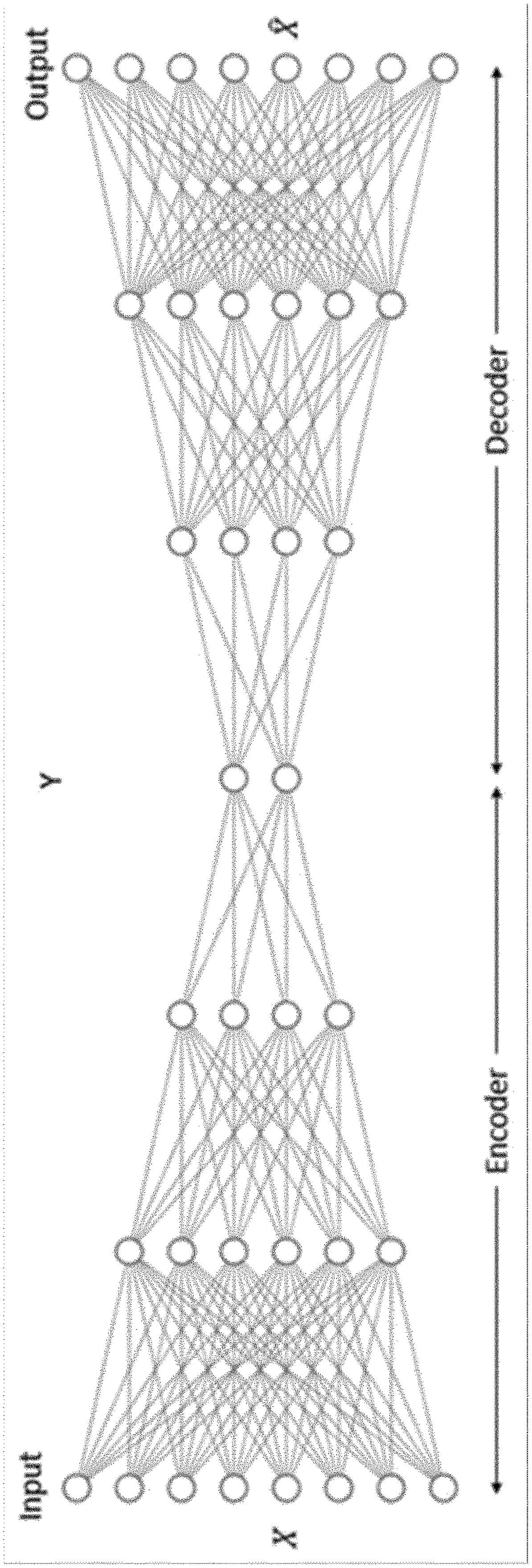
FIG. 4 illustrates a fully connected neural network auto-encoder (NNAE) architecture.

FIG. 4 illustrates a simple fully connected (dense) NNAE architecture. This exemplary AE is divided into two parts: an encoder (located in the UE), and a decoder (located in the network, e.g., RAN node). The output of the encoder (so-called "bottleneck layer" of the NNAE) represents the codeword that is to be signaled from the UE to the network over the UL. The codeword can be viewed as a sequence of latent variables, which describe the latent representation of the channel.

In addition to the fully-connected (dense) architecture show in FIG. 4, NNAEs can be based on other fully-connected NNs, multi-dimensional convolution NNs, recurrent NNs, or any combination thereof. However, all NNAE architectures have the encoder-bottleneck-decoder structure illustrated in FIG. 4. The size of the codeword (denoted Y in FIG. 4) of an NNAE is typically much smaller than the size of the input data (X in FIG. 4). The encoder reduces the dimensionality of the input features with increasing depth of the neural network. The decoder essentially tries to invert the encoder and reconstruct the original input data with minimal error (according to some predefined loss function).

The architecture of an NNAE (e.g., number of layers) typically needs to be numerically optimized for the specific application (e.g., channel compression) via a process called hyperparameter tuning. Properties of the data (e.g., CSI-RS channel estimates), the channel size, uplink feedback rate, and hardware limitations of the encoder and decoder all need to be considered when optimizing the NNAE's architecture.

The weights and biases of an NNAE (with a fixed architecture) are trained to minimize the error between the input X and reconstructed output $\hat{X}$ ("reconstruction error") on some training dataset. For example, the weights and biases can be trained to minimize the mean squared error (MSE) $(X-\hat{X})^2$. Model training is typically done using a variant of the gradient descent algorithm on a large data set. The training data set should be representative of the actual data the NNAE will encounter during live operation. The process of designing an NNAE (hyperparameter tuning and model training) is typically expensive—consuming significant time, compute, memory, and power resources.

For various reasons, NNAE-based CSI feedback by UEs is of interest for 3GPP Rel-18 and beyond to support MU-MIMO DL transmissions by networks. As an example, NNAEs can include non-linear transformations (e.g., activation functions) that help improve compression performance and, therefore, MU-MIMO performance for the same UL overhead. In contrast, the normal Type II CSI codebooks in Rel-15 and Rel-16 are based on linear DFT transformations and SVD decompositions, which cannot fully exploit redundancies in the channel for compression.

NNAEs can also be trained to exploit long-term redundancies in the propagation environment and/or site (e.g., antenna configuration) for compression purposes. For example, a particular NNAE does not need to work well for all possible deployments. Improved compression performance is obtained by learning which channel inputs it needs to (and doesn't need to) reliably reconstruct at the base-station.

NNAEs can also be trained to compensate for antenna array irregularities, such as non-uniformly and/or non-half wavelength element spacing. In contrast, the Type II CSI codebooks in Rel-15 and Rel-16 use a two-dimensional DFT codebook designed for a regular planar array with perfect half wavelength element spacing.

NNAEs can also be updated (e.g., via transfer learning and training) to compensate for failing hardware as the product ages. For example, over time Tx and Rx radio chains will fail compromising the effectiveness of Type II CSI feedback.

Figure 5:
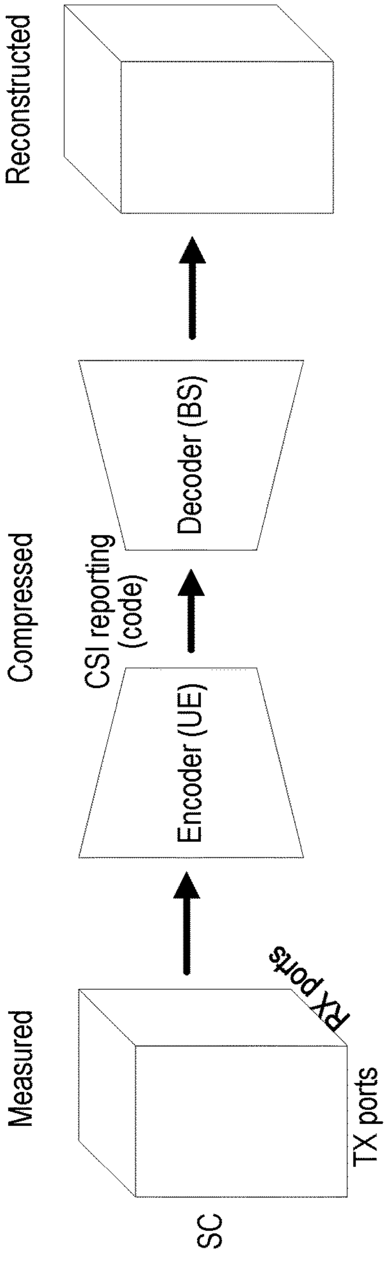
FIG. 5 illustrates an exemplary application of NNAEs to MIMO transmission.

FIG. 5 illustrates an exemplary application of NNAEs to MIMO transmission. The UE measures the channel in the downlink using CSI-RS. The UE estimates that channel for each OFDM subcarrier (SC) from each RAN node TX antenna and at each UE RX antenna. The estimate can be viewed as a three-dimensional (3D) channel matrix or tensor. The 3D channel matrix representing the MIMO channel estimated over several subcarriers is input to the encoder.

For compression of UL CSI reports for the DL channel, the encoder is implemented in the UE and the decoder is implemented in the network (e.g., RAN node). It is also possible to reverse the CSI reporting operation, such that the RAN node measures the UL channel using UE transmitted SRS and reports uplink CSI to the UE using an NNAE encoder. The UL channel can then be reconstructed by the UE using the corresponding NNAE decoder.

The CSI feedback schemes used in 3GPP networks (e.g., Type I, Rel-15 Type II and Rel-16 Enhanced Type II) do not specify UE-side algorithms. Rather, the standardization approach has been to allow UE-vendor proprietary solutions, e.g., for how the UE select the preferred precoder and/or rank. For example, in Rel-15 Type II CSI reporting, 3GPP standards do not specify how the UE selects L DFT vectors from a codebook based on its estimate of the DL channel from CSI-RS. What is specified is the codebook itself and a CSI report format, so the RAN node can correctly interpret the format and content of the UE's CSI report.

Despite potentially offering improved performance, NNAE-based CSI feedback solutions have various problems, issues, and/or difficulties when considering what aspects should be standardized and what aspects should be left for implementation. In general, a UE's encoder can be a complicated NN with thousands of tunable parameters (e.g., weights and biases). The UE's compute and energy resources are limited, and, therefore, the encoder will likely need to be known in advance to the UE. For example, the encoder's architecture will need to match the UE's hardware (e.g., chipset), and the NN model (with weights and biases possibly fixed) will need to be compiled with appropriate optimizations for the UE's hardware. The process of compiling the encoder can be costly in time, compute, power, and memory resources.

The weights and biases of the encoder and the decoder will, at least initially, need to be jointly trained on a dataset. At a later stage, the encoder can be fixed with the decoder being further optimized for a particular deployment (e.g., a particular RAN node antenna array) via a process called transfer learning. This allows the network vendor to implement a proprietary decoder so long as it has access to the UE's encoder (or to an accurate emulator thereof). If the UE implements a proprietary encoder that is unknown to the network, then it is not possible for the network to implement a corresponding decoder. Essentially, the network must solve an extremely difficult, ill-posed, model identification problem.

Two approaches to addressing these difficulties are to standardize the UE's encoder or to share the UE's encoder with network vendors. However, both approaches are problematic for an open, multi-vendor network. Even so, network support of UE-proprietary solutions, implementations, and/or optimization is important for maintaining competition in multi-vendor systems.

To summarize, UE vendors require support of proprietary NNAE encoders and network vendors requires support of proprietary NNAE decoders. The decoder design process needs to have access to the UE's encoder to perform hyperparameter optimization, training, and validation, which can be problematic since this is proprietary information for UE vendors and/or UE chipset vendors. Meanwhile, the encoder design process will need hyperparameter optimization, training, and validation.

Embodiments of the present disclosure address these and other problems, issues, and/or difficulties by providing techniques that split the CSI compression and reporting procedure in the UE into two mapping operations: a proprietary mapping $f_{UE}$, and a standardized mapping $f_{3GPP}$. A standardized channel feature set interface can connect the proprietary and standardized mappings. As such, tuning of the AE parameters is not performed on the channel itself, but on an idealized version that captures the main features of a real-world channel. This leaves room for implementation to handle the real-world channel deviations from the idealized channel that was described by the channel feature set.

At a high level, embodiments include the following, individually or in any combination:

A standardized channel feature set that is known to all parties (e.g., UE, UE chipset, and network vendors), may be described in 3GPP documents (e.g., specification and/or report), and can be used during AE standardization phase.

A proprietary mapping, $f_{UE}$, at the UE that transforms received CSI-RS to standardized channel features.

A standardized ML-based compressor at the UE, $f_{3GPP}$, that compresses the standardized channel features to Y, e.g., a binary codeword. The codeword is the content of the CSI report, communicated over the UL from UE to the network.

A proprietary ML-based decompressor, $f_{network}$, that reconstructs (e.g., at the RAN node) the compressed channel features from the UE-reported codeword.

Embodiments of the present disclosure can provide various benefits, advantages, and/or solutions to various problems. For example, embodiments facilitate proprietary enhancements to channel information compression by UE vendors and/or UE chipset vendors, including ML-based channel estimation, prediction, and model order selection for the channel features. As another example, embodiments facilitate proprietary enhancements to channel information decompression by network vendors such as scenario-specific channel decompression, transfer learning, etc. At the same time, embodiments provide a standardized, ML-based CSI reporting solution that can work in a multi-vendor 3GPP system. At a high level, embodiments provide a solution that includes desirable aspects of both proprietary and standardized approaches while avoiding and/or reducing the undesirable aspects of both approaches.

Figure 6:
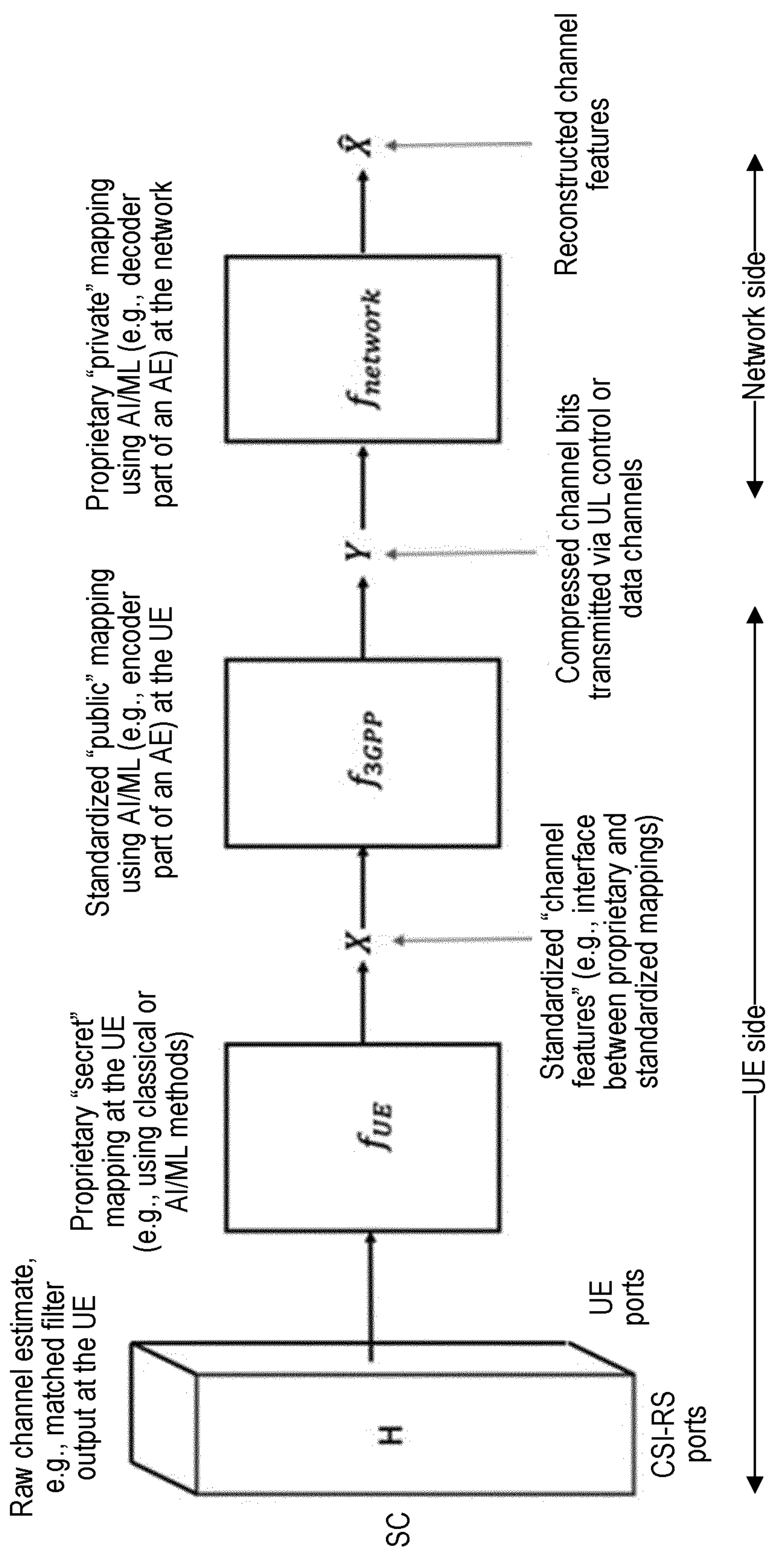
FIG. 6 shows an arrangement of UE-side and network-side functionality according to various embodiments of the present disclosure.

FIG. 6 shows an arrangement of UE-side and network-side functionality according to various embodiments of the present disclosure. In this arrangement, the UE operation of compressing a CSI-RS channel estimate (H) for UL feedback is split into two procedures: a proprietary mapping, $f_{UE}$, and a standardized mapping, $f_{3GPP}$. The proprietary mapping, $f_{UE}$, can be based on classical signal processing methods (e.g., current Type II Rel 16 reporting) or AI/ML technologies (e.g., trained neural networks). The output of the proprietary mapping is the input to the standardized mapping $f_{3GPP}$. The standardized mapping, $f_{3GPP}$, can be based on AI/ML technologies (e.g., an AE encoder). The channel features interface, which connects $f_{UE}$ and $f_{3GPP}$, can be standardized. The channel decompressor at the network, $f_{network}$, can be a proprietary, ML-based solution.

It is possible that 3GPP standards may specify multiple $f_{3GPP}$ mappings for different scenarios and configurations, e.g., low/high mobility, number of antennas and/or CSI-RS ports, when CSI-RS ports are beamformed, antenna-specific, etc. For example, one $f_{3GPP}$ can resemble a Type II CSI-RS port selection.

In some embodiments, the UE can report its supported $f_{3GPP}$ mappings to the network using UE capability signaling (e.g., UEInformationRequest, UEInformationResponse). For example, the UE can report capabilities per frequency band or per frequency band combination. The network can then configure which $f_{3GPP}$ to use for CSI reporting by a particular UE, e.g., per CSI report setting. In some cases, the network may configure multiple concurrent CSI reports using different $f_{3GPP}$ from a particular UE.

In some embodiments, the network can enable or disable the proprietary mapping $f_{UE}$ by signaling to the UE, e.g., using RRC signaling. If the proprietary mapping $f_{UE}$ is disabled, the UE shall use only the standardized mapping $f_{3GPP}$. Having $f_{UE}$ disabled corresponds to the setting used during 3GPP standardization of the AE and thus would be a robust fallback with potentially lower latency.

The minimum time from triggering a CSI report to the time where the UE reports the CSI can depend on which of a plurality of available $f_{3GPP}$ is used for the report. The minimum time can be related to the NN size, e.g., a larger minimum time can be allowed for a larger NN. Also, the minimum time can depend on whether $f_{UE}$ is enabled or disabled for the report.

In some embodiments, whether a CSI report should have $f_{UE}$ disabled or enabled can be configured in the CSI report setting. Alternatively, it can be standardized that $f_{UE}$ is always disabled for certain CSI reports, e.g., on PUCCH. When $f_{UE}$ is disabled, the reported CSI will resemble the channel feature set only. For example, this may be useful for calibration or as a fallback CSI report in case there is mismatch between encoder and decoder.

In various embodiments, a channel-feature space can be defined based on the existing 3GPP codebook from a previous release. For example, the standard 2D DFT codebook used in for normal Rel 15 Type II and Rel 16 Enhanced Type II CSI reporting can be the basis for the channel-feature space. Additionally, an antenna-feature space can be defined by the UE's antenna ports and configured CSI-RS resources In some embodiments, the UE computes a channel estimate in the antenna-frequency space using a proprietary channel estimator. The estimated channel has dimension $P \times N_3$, where P is the number of configured CSI-RS ports and $N_3$ is the number of sub-bands or other frequency units (e.g., subcarrier, physical resource block (PRB), group of PRBs, etc.) that depends on the frequency domain granularity of CSI-RS.

In one variant, the UE can then map the CSI-RS channel estimate to a 2L ($L \leq P/2$) dimensional subspace of the DFT beam space, such as existing Rel-15 Type II CSI reporting in existing standard. For example, the UE multiplies the channel estimate (for each polarization) by a 2D DFT matrix, thereby transforming the channel from the antenna domain to the beam domain. The UE selects the L strongest DFT beams over the band (for each polarization) based on received power, and then normalizes the resulting beam subspace channel. This normalization can be done, for example, by dividing by the Frobenius norm of the subspace. In general, the Frobenius (or Euclidean) norm can be determined as the square root of the sum of the absolute squares of the elements of a matrix representing the subspace.

The mapping from the CSI-RS channel estimates to the 2L dimensional DFT beam space channel is proprietary for the UE. The network does not know how the UE implements this mapping, but it can expect that the UE's proprietary algorithm produces a normalized 2L dimensional DFT beam space projection of the estimated channel.

In another variant, the UE can then map the CSI-RS channel estimate to a 2LM ($L \leq P/2$, $M \leq N_3$) dimensional subspace of the DFT beam space with frequency domain compression, such as existing Rel-16 Type II CSI reporting. For example, the UE multiplies the channel estimate (for each polarization) by a 2D DFT matrix, thereby transforming the channel from the antenna domain to the beam domain. The UE selects the L strongest DFT beams over the band (for each polarization) based on received power and then normalizes the resulting beam subspace channel, e.g., based on the Frobenius norm as described above. The UE then calculates a SVD for each sub-band of the beam subspace channel and then stacks the 1-th dominant eigen vector for each sub-band (determined in SVD) in a matrix $W_{2,l} \in \mathbb{C}^{2L \times N_3}$ for layer 1. The UE determines the M best DFT vectors, each with dimension $N_3 \times 1$, for approximating $W_{2,l} \in \mathbb{C}^{2L \times N_3}$ (compressing $W_{2,l}$ in frequency domain).

The mapping from the CSI-RS channel estimates to the 2LM dimensional DFT beam space channel with frequency domain compression is proprietary for the UE. The network does not know how the UE implements this mapping, but it can expect that the UE's proprietary algorithm produces a normalized 2LM dimensional projection of the estimated channel onto the DFT beam space with frequency domain compression. The channel-feature space input, in this variant, consists of at least one of the following:

2L-dimensional beam subspace channel;

DFT beam indices that formed the basis vectors of the beam subspace channel;

Frobenius norm of the beam subspace channel;

2LM-dimensional beam subspace channel with frequency domain compression.

Indices of DFT vectors that are selected for compressing $W_{2,l}$ in frequency domain.

$W_{2,l}$.

In various embodiments, an AE encoder $f_{3GPP}$ can be developed during 3GPP standardization phase and may be included in 3GPP specifications. The AE encoder $f_{3GPP}$ is used to compress the 2L-dimensional or the 2LM-dimensional subspace channel discussed above. Alternatively, the AE encoder $f_{3GPP}$ is not specified in 3GPP documents but is UE-specific and can be shared between a UE vendor and network vendors in various ways.

In general, the performance of a standardized AE encoder $f_{3GPP}$ can be validated (e.g., in 3GPP or vendor studies) using proprietary decoders on synthetic or real channel data sets. For example, one or more standardized system-level simulation scenarios can be used to produce antenna-domain channels, from which the 2L or the 2LM dimensional beam space channels can be derived. The loss function for training the standardized AE encoder $f_{3GPP}$ only considers the 2L-dimensional or the 2LM-dimensional beam subspace channel. In other words, it quantifies how well the AE encoder compresses the beam subspace channel. For example, the loss function could be mean squared error (MSE). In any case, the loss function must be specified for the standardized AE encoder $f_{3GPP}$.

The network vendor can train, validate, and test a proprietary AE decoder $f_{network}$ using its own channel datasets and the standardized AE encoder $f_{3GPP}$. The network vendor implements its own version of the UE's channel estimator and beam subspace mappings. The loss function for training the proprietary AE decoder $f_{network}$ can also be proprietary; at least it is not required to be specified by 3GPP.

In some embodiments, L (i.e., the dimension used in mapping from the CSI-RS channel estimates to the DFT beam space) can be configured by the network (e.g., via RRC, downlink control information (DCI), or MAC control element (CE)), by the UE (e.g., via UE capability signaling), or specified as part of the standardized mapping $f_{3GPP}$.

In some embodiments, the network configures L and the UE has the option to fall back to Rel 16 Type II CSI reporting. For example, the UE can report the compressed explicit 2L dimensional beamspace channel using the AE or the UE can fall back to a Type II codebook with subband or wideband granularity for the co-phasing coefficients.

In some embodiments, M (i.e., the number of DFT vectors selected by the UE for frequency domain compression) can be configured by the network (e.g., via RRC, DCI, or MAC CE), by the UE (e.g., via UE capability signaling), or specified as part of the standardized mapping $f_{3GPP}$.

In some embodiments, different sets of channel feature sets are specified and configurable by the UE and/or by the network. In some embodiments, one or more AE encoders can be available (e.g., standardized) for each channel feature set.

In some embodiments, the AE encoder can be configured to perform differential compression, e.g., of the difference between the last reported CSI and the current determined CSI.

In some embodiments, the two-dimensional DFT codebook can be an oversampled two-dimensional DFT codebook, such that the number of DFT vectors is greater than (e.g., an integer multiple of) the number of elements in each DFT vector (which can correspond to the number of antenna elements).

In some embodiments, the UE can transform the 2L- or 2LM-dimensional beam subspace channel (determined as described above) into a beam-delay domain by an inverse DFT mapping. For example, this can be part of the standardized mapping $f_{3GPP}$ or the proprietary mapping $f_{UE}$.

In some embodiments, the standardized channel feature set can include the UE's estimate of one or more of the following, individually or in any combination:

- CSI-RS channel Doppler power spectrum;
- CSI-RS channel dominant delays;
- dominant delays of the 2L-dimensional beam space channel; and
- Doppler power spectrum of the 2L-dimensional beam space channel.

In some embodiments, rather than being standardized, the AE encoder $f_{3GPP}$ can be shared between UE and network vendors. The network vendor designs its own encoder that approximates the UE's encoder. This can be done, for example, via a teacher-student method, whereby the network trains its encoder on the output of the UE's encoder rather than the original dataset used to train the UE's encoder.

Figure 7:
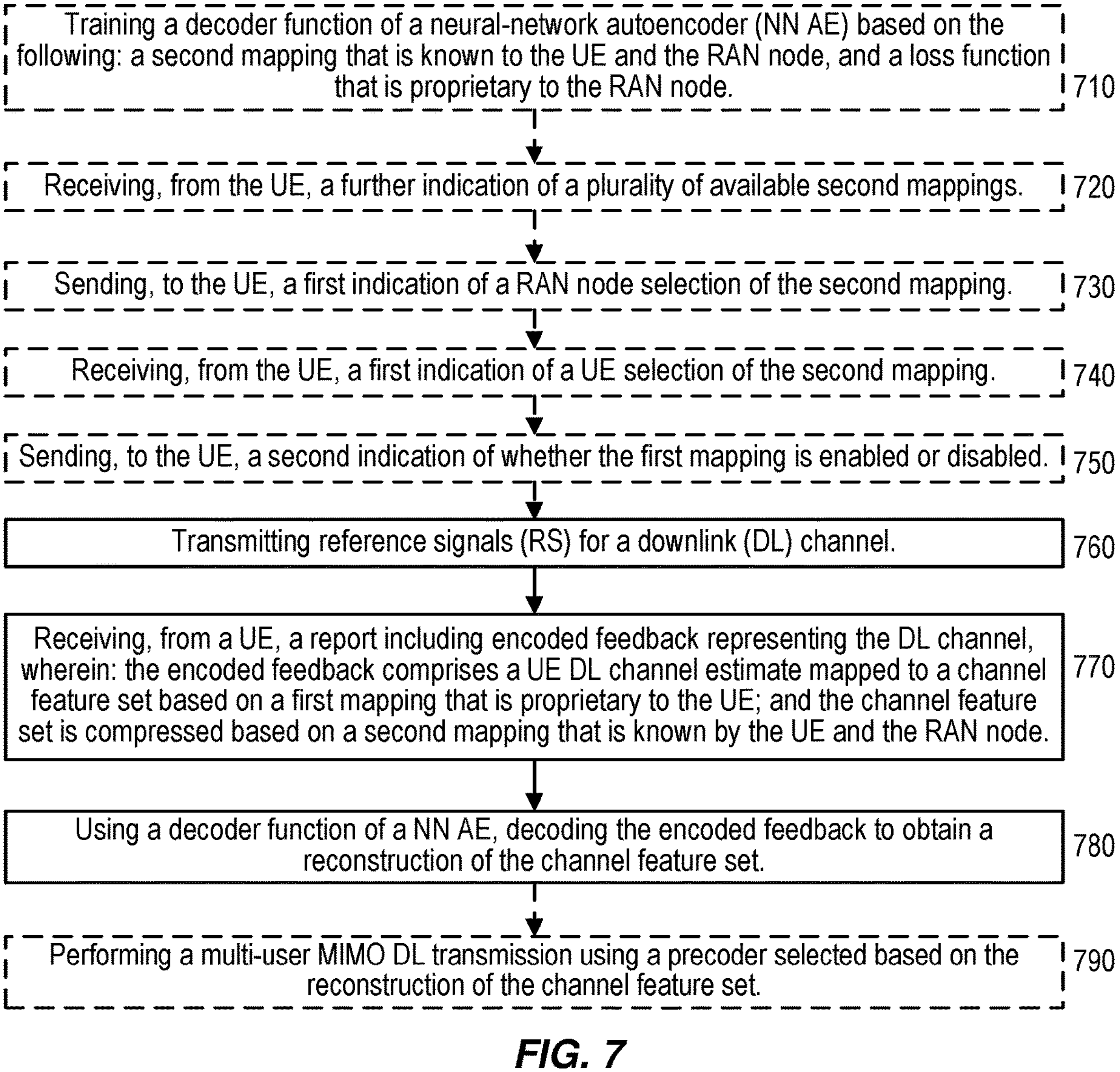
FIG. 7 shows a flow diagram of an exemplary method for a RAN node (e.g., base station, eNB, gNB, ng-eNB, etc.), according to various embodiments of the present disclosure.
Figure 8:
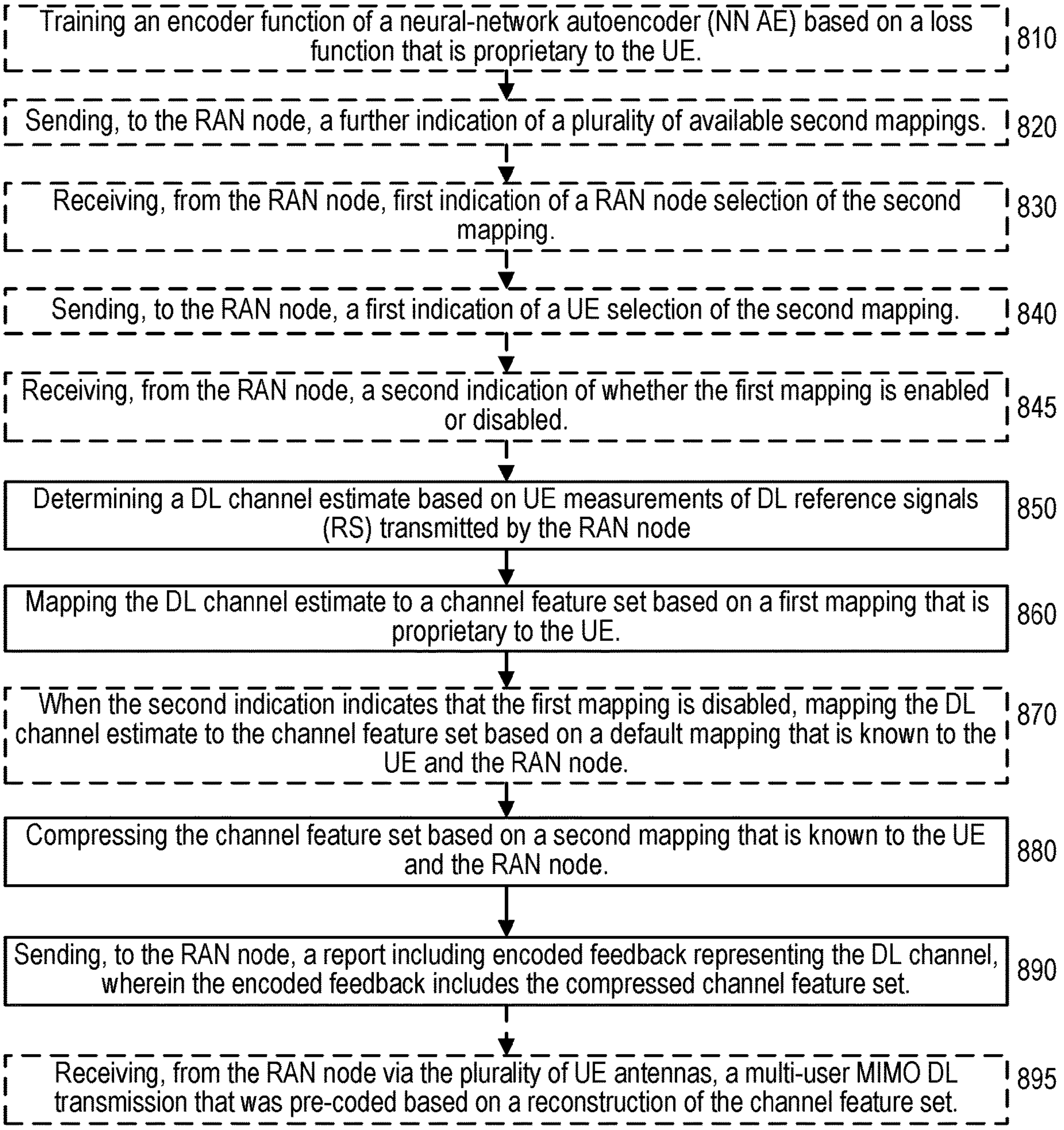
FIG. 8 shows a flow diagram of an exemplary method for UE (e.g., wireless device, etc.) of a wireless network, according to various embodiments of the present disclosure.

The embodiments described above can be further illustrated with reference to FIGS. 7-8, which show exemplary methods (e.g., procedures) for a RAN node and a UE, respectively. In other words, various features of operations described below correspond to various embodiments described above. These exemplary methods can be used cooperatively to provide various exemplary benefits and/or advantages. Although FIGS. 7-8 show specific blocks in a particular order, the operations of the respective methods can be performed in different orders than shown and can be combined and/or divided into blocks having different functionality than shown. Optional blocks or operations are indicated by dashed lines. The following description also refers to certain sub-blocks that are not shown in the figures.

In particular, FIG. 7 shows a flow diagram of an exemplary method (e.g., procedure) for a RAN node configured to serve one or more user equipment (UEs), according to various embodiments of the present disclosure. The exemplary method can be performed by a RAN node (e.g., base station, eNB, gNB, ng-eNB, etc., or components thereof) such as described elsewhere herein.

The exemplary method can include operations of blocks 760-770, where the RAN node can transmit reference signals (e.g., CSI-RS) for a DL channel and receive, from a UE, a report including encoded feedback representing the DL channel. The encoded feedback can include a UE DL channel estimate mapped to a channel feature set based on a first mapping that is proprietary to the UE (i.e., unknown to the RAN node), with the channel feature set being compressed based on a second mapping that is known by the UE and the RAN node (e.g., standardized). The exemplary method can also include the operations of block 780, where the RAN node can, using a decoder function of a neural-network autoencoder (NNAE), decode the encoded feedback to obtain a reconstruction of the channel feature set.

In some embodiments, the second mapping can be an encoder function of the NNAE, e.g., that is compatible with the decoder function. In some embodiments, the decoder function is proprietary to the RAN node (i.e., unknown to the UE). In some embodiments, the exemplary method can also include the operations of block 710, where the RAN node can train the decoder function based on the second mapping and a loss function that is proprietary to the RAN node.

In some embodiments, the second mapping is one of a plurality of available second mappings (e.g., corresponding to a plurality of encoder functions and/or a plurality of NNAEs). In some of these embodiments, the exemplary method can also include the operation of block 740, where the RAN node can receive from the UE a first indication of a UE selection of the second mapping (i.e., from the available second mappings).

In other of these embodiments, the exemplary method can also include the operation of block 730, where the RAN node can send to the UE a first indication of a RAN node selection of the second mapping. In some of these embodiments, the exemplary method can also include the operations of block 720, where the RAN node can receive, from the UE, a further indication of the plurality of available second mappings. In such embodiments, the first indication of the RAN node selection is sent (e.g., in block 730) in response to the further indication.

In some of these embodiments, the plurality of available second mappings can differ with respect to one or more of the following: UE mobility, number of antennas and/or RS ports used by the UE, beamforming of RS ports by the UE, and UE antenna configuration.

In some embodiments, the exemplary method can also include the operations of block 750, where the RAN node can send to the UE a second indication of whether the first mapping is enabled or disabled. In some of these embodiments, when the second indication indicates that the first mapping is disabled, the UE DL channel estimate is mapped to the first channel feature set based on a default mapping that is known by the UE and the RAN node.

In some embodiments, the channel feature set can include one or more of the following: Doppler power spectrum of the DL channel, and dominant delays of DL channel.

In other embodiments, the channel feature set can include a representation of a subspace of a plurality of Discrete Fourier Transform (DFT) vectors that correspond to a respective plurality of beams transmitted by the RAN node. In some of these embodiments, subspace includes one the following:

- a normalized 2L-dimensional projection of the UE DL channel estimate onto a beam space represented by the DFT vectors; or
- a normalized 2LM-dimensional projection of the UE DL channel estimate onto the beam space represented by the DFT vectors, with frequency domain compression.

In some of these embodiments, the representation of the subspace comprises at least one of the following: indices of the DFT vectors included in the normalized 2L- or 2LM-dimensional projection; and Frobenius norm of the subspace. In some variants, at least one of L and M is configurable by the RAN node. Examples of these embodiments were discussed in more detail above.

In some of these embodiments, the representation of the subspace comprises one or more of the following: Doppler power spectrum of the subspace, and dominant delays of the subspace. This can be the case, for example, when the UE transforms the 2L- or 2LM-dimensional beam subspace channel into a beam-delay domain by an inverse DFT mapping.

In some embodiments, the exemplary method can also include the operations of block 790, where the RAN node can perform a multi-user MIMO DL transmission using a precoder selected based on the reconstruction of the channel feature set. These operations are exemplified by the arrangement shown in FIG. 1 and discussed in more detail above.

In addition, FIG. 8 shows a flow diagram of an exemplary method (e.g., procedure) for a UE configured to communicate with a RAN node, according to various embodiments of the present disclosure. The exemplary method can be performed by a UE (e.g., wireless device, IoT device, modem, etc. or component thereof) such as described elsewhere herein.

The exemplary method can include operations of block 850, where the UE can determine a DL channel estimate based on UE measurements of DL RS (e.g., CSI-RS) transmitted by the RAN node. The exemplary method can also include operations of block 860, where the UE can map the DL channel estimate to a channel feature set based on a first mapping that is proprietary to the UE (i.e., unknown to the RAN node). The exemplary method can also include operations of block 880, where the UE can compress the channel feature set based on a second mapping that is known by the UE and the RAN node (e.g., standardized). The exemplary method can also include operations of block 890, where the UE can send to the RAN node a report including encoded feedback representing the DL channel, wherein the encoded feedback includes the compressed channel feature set.

In some embodiments, the second mapping can be an encoder function of the NNAE. In some embodiments, the decoder function of the NNAE (e.g., at the RAN node) is proprietary to the RAN node (i.e., unknown to the UE). In some embodiments, the exemplary method can also include the operations of block 810, where the UE can train the encoder function based on a loss function that is proprietary to the UE.

In some embodiments, the second mapping is one of a plurality of available second mappings (e.g., corresponding to a plurality of encoder functions and/or a plurality of NNAEs). In some of these embodiments, the exemplary method can also include the operation of block 840, where the UE can send to the RAN node a first indication of a UE selection of the second mapping (i.e., from the available second mappings).

In other of these embodiments, the exemplary method can also include the operations of block 830, where the UE can receive from the RAN node a first indication of a RAN node selection of the second mapping (i.e., from the available second mappings). In some of these embodiments, the exemplary method can also include the operations of block 820, where the UE can send to the RAN node a further indication of the plurality of available second mappings. In such embodiments, the first indication of the RAN node selection is received (e.g., in block 830) in response to the further indication.

In some of these embodiments, the plurality of available second mappings can differ with respect to one or more of the following: UE mobility, number of antennas and/or RS ports used by the UE, beamforming of RS ports by the UE, and UE antenna configuration.

In some embodiments, the exemplary method can also include the operations of block 845, where the UE can receive, from the RAN node, a second indication of whether the first mapping is enabled or disabled. In some of these embodiments, mapping the DL channel estimate to the channel feature set based on the first mapping (e.g., in block 860) is responsive to the second indication indicating that the first mapping is enabled. Additionally, the exemplary method can also include the operations of block 870, where when the second indication indicates that the first mapping is disabled, the UE can map the DL channel estimate to the channel feature set based on a default mapping that is known by the UE and the RAN node.

In some embodiments, the channel feature set can include one or more of the following: Doppler power spectrum of the DL channel, and dominant delays of DL channel.

In other embodiments, the channel feature set can include a representation of a subspace of a plurality of DFT vectors that correspond to a respective plurality of beams transmitted by the RAN node. In some of these embodiments, the subspace includes one the following:

- a normalized 2L-dimensional projection of the UE DL channel estimate onto a beam space represented by the DFT vectors; or
- a normalized 2LM-dimensional projection of the UE DL channel estimate onto the beam space represented by the DFT vectors, with frequency domain compression.

In some of these embodiments, the representation of the subspace comprises at least one of the following: indices of the DFT vectors included in the normalized 2L- or 2LM-dimensional projection; and Frobenius norm of the subspace. In some variants, at least one of L and M is configurable by the RAN node. Examples of these embodiments were discussed in more detail above.

In some of these embodiments, the representation of the subspace comprises one or more of the following: Doppler power spectrum of the subspace, and dominant delays of the subspace. This can be the case, for example, when the UE transforms the 2L- or 2LM-dimensional beam subspace channel into a beam-delay domain by an inverse DFT mapping.

In some embodiments, the DL channel estimate is determined (e.g., in block 850) based on receiving the DL RS via a plurality of UE antennas. In such embodiments, the exemplary method can also include the operations of block 895, where the UE can receive, from the RAN node via the plurality of UE antennas, a multi-user MIMO DL transmission that was pre-coded based on a reconstruction of the channel feature set. This operation corresponds to operations of FIG. 7 block 790, discussed above, and is exemplified by the arrangement shown in FIG. 1.

Figure 9:
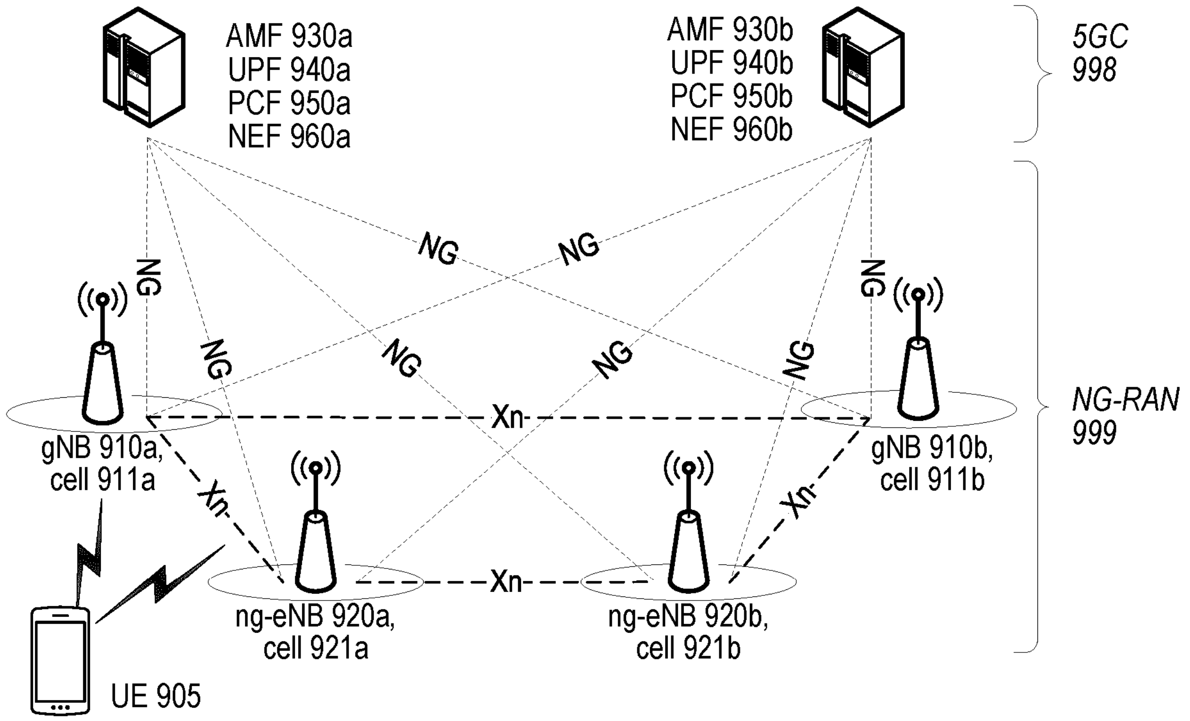
FIG. 9 illustrates a high-level views of an exemplary 5G/NR network architecture.

FIG. 9 shows a high-level view of an exemplary 5G network architecture in which various embodiments of the present disclosure can be implemented. The exemplary architecture shown in FIG. 9 includes a Next Generation Radio Access Network (NG-RAN) 999 and a 5G Core (5GC) 998. As shown in the figure, NG-RAN 999 can include gNBs (e.g., 910*a,b*) and ng-eNBs (e.g., 920*a,b*) that are interconnected with each other via respective Xn interfaces. The gNBs and ng-eNBs are also connected via the NG interfaces to 5GC, more specifically to the access and mobility management functions (AMFs, e.g., 930*a,b*) via respective NG-C interfaces and to the user plane functions (UPFs, e.g., 940*a,b*) via respective NG-U interfaces. Moreover, the AMFs can communicate with one or more policy control functions (PCFs, e.g., PCFs 950*a,b*) and network exposure functions (NEFs, e.g., NEFs 960*a,b*).

Each of the gNBs can support the NR radio interface including frequency division duplexing (FDD), time division duplexing (TDD), or a combination thereof. In contrast, each of ng-eNBs can support the LTE radio interface but, unlike conventional LTE eNodeBs (eNBs), connect to the 5GC via the NG interface. Each of the gNBs and ng-eNBs can serve a geographic coverage area including one more cells, including cells 911*a-b* and 921*a-b* shown as exemplary in FIG. 9. The gNBs and ng-eNBs can also use various directional beams to provide coverage in the respective cells. For example, the gNBs and ng-eNBs can be embodiments of a RAN node configured to perform operations corresponding to the method shown in FIG. 7. Depending on the cell in which it is located, a UE 905 can communicate with the gNB or ng-eNB serving that cell via the NR or LTE radio interface, respectively. For example, UE 905 can be an embodiment of a UE configured to perform operations corresponding to the method shown in FIG. 8.

The gNBs shown in FIG. 9 can include a central (or centralized) unit (CU or gNB-CU) and one or more distributed (or decentralized) units (DU or gNB-DU), which can be viewed as logical nodes. CUs host higher-layer protocols and perform various gNB functions such controlling the operation of DUs, which host lower-layer protocols and can include various subsets of the gNB functions. As such, each of the CUs and DUs can include various circuitry needed to perform their respective functions, including processing circuitry, communication interface circuitry (e.g., for communication via Xn, NG, radio, etc. interfaces), and power supply circuitry.

A CU connects to its associated DUs over respective F1 logical interfaces. A CU and associated DUs are only visible to other gNBs and the 5GC as a gNB, e.g., the F1 interface is not visible beyond a CU. A CU can host higher-layer protocols such as F1 application part protocol (F1-AP), Stream Control Transmission Protocol (SCTP), GPRS Tunneling Protocol (GTP), Packet Data Convergence Protocol (PDCP), User Datagram Protocol (UDP), Internet Protocol (IP), and Radio Resource Control (RRC) protocol. In contrast, a DU can host lower-layer protocols such as Radio Link Control (RLC), Medium Access Control (MAC), and physical-layer (PHY) protocols. Other variants of protocol distributions between CU and DU are also possible.

Figure 10:
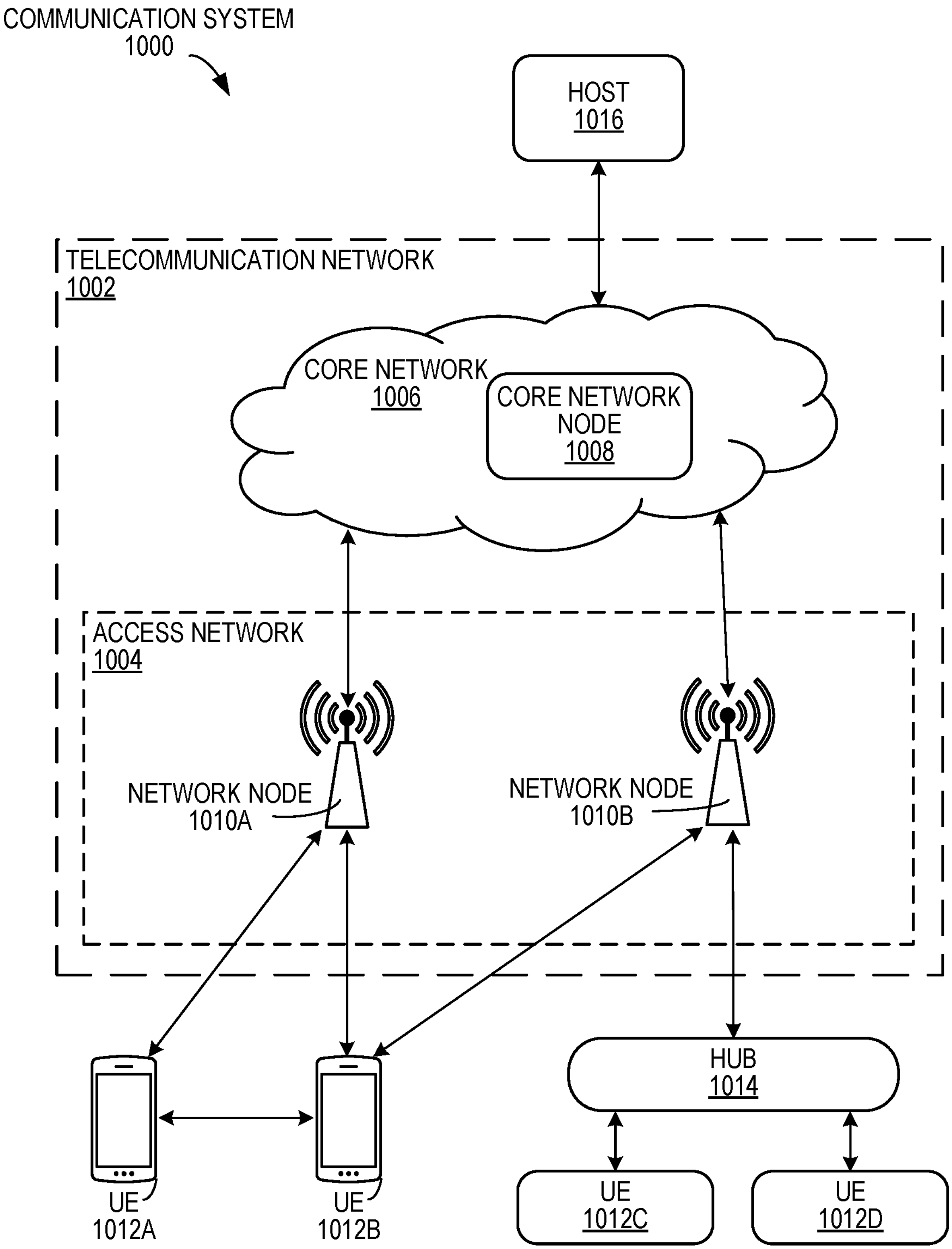
FIG. 10 shows a communication system according to various embodiments of the present disclosure.

FIG. 10 shows an example of a communication system 1000 in accordance with some embodiments. In this example, the communication system 1000 includes a telecommunication network 1002 that includes an access network 1004, such as a radio access network (RAN), and a core network 1006, which includes one or more core network nodes 1008. The access network 1004 includes one or more access network nodes, such as network nodes 1010*a* and 1010*b* (one or more of which may be generally referred to as network nodes 1010), or any other similar 3GPP access node or non-3GPP access point. The network nodes 1010 facilitate direct or indirect connection of UEs, such as by connecting UEs 1012*a*, 1012*b*, 1012*c*, and 1012*d* (one or more of which may be generally referred to as UEs 1012) to the core network 1006 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system 1000 may include any number of wired or wireless networks, network nodes, UEs, and/or any other components or systems that may facilitate or participate in the communication of data and/or signals whether via wired or wireless connections. The communication system 1000 may include and/or interface with any type of communication, telecommunication, data, cellular, radio network, and/or other similar type of system.

The UEs 1012 may be any of a wide variety of communication devices, including wireless devices arranged, configured, and/or operable to communicate wirelessly with the network nodes 1010 and other communication devices. Similarly, the network nodes 1010 are arranged, capable, configured, and/or operable to communicate directly or indirectly with the UEs 1012 and/or with other network nodes or equipment in the telecommunication network 1002 to enable and/or provide network access, such as wireless network access, and/or to perform other functions, such as administration in the telecommunication network 1002.

In the depicted example, the core network 1006 connects the network nodes 1010 to one or more hosts, such as host 1016. These connections may be direct or indirect via one or more intermediary networks or devices. In other examples, network nodes may be directly coupled to hosts. The core network 1006 includes one more core network nodes (e.g., core network node 1008) that are structured with hardware and software components. Features of these components may be substantially similar to those described with respect to the UEs, network nodes, and/or hosts, such that the descriptions thereof are generally applicable to the corresponding components of the core network node 1008. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF).

The host 1016 may be under the ownership or control of a service provider other than an operator or provider of the access network 1004 and/or the telecommunication network 1002, and may be operated by the service provider or on behalf of the service provider. The host 1016 may host a variety of applications to provide one or more service. Examples of such applications include live and pre-recorded audio/video content, data collection services such as retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system 1000 of FIG. 10 enables connectivity between the UEs, network nodes, and hosts. In that sense, the communication system may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable 2G, 3G, 4G, 5G standards, or any applicable future generation standard (e.g., 6G); wireless local area network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi, and/or any low-power wide-area network (LPWAN) standards such as LoRa and Sigfox.

In some examples, the telecommunication network 1002 is a cellular network that implements 3GPP standardized features. Accordingly, the telecommunications network 1002 may support network slicing to provide different logical networks to different devices that are connected to the telecommunication network 1002. For example, the telecommunications network 1002 may provide Ultra Reliable Low Latency Communication (URLLC) services to some UEs, while providing Enhanced Mobile Broadband (eMBB) services to other UEs, and/or Massive Machine Type Communication (mMTC)/Massive IoT services to yet further UEs.

In some examples, the UEs 1012 are configured to transmit and/or receive information without direct human interaction. For instance, a UE may be designed to transmit information to the access network 1004 on a predetermined schedule, when triggered by an internal or external event, or in response to requests from the access network 1004. Additionally, a UE may be configured for operating in single- or multi-RAT or multi-standard mode. For example, a UE may operate with any one or combination of Wi-Fi, NR (New Radio) and LTE, i.e., being configured for multi-radio dual connectivity (MR-DC), such as E-UTRAN (Evolved-UMTS Terrestrial Radio Access Network) New Radio-Dual Connectivity (EN-DC).

In the example, the hub 1014 communicates with the access network 1004 to facilitate indirect communication between one or more UEs (e.g., UE 1012*c* and/or 1012*d*) and network nodes (e.g., network node 1010*b*). In some examples, the hub 1014 may be a controller, router, content source and analytics, or any of the other communication devices described herein regarding UEs. For example, the hub 1014 may be a broadband router enabling access to the core network 1006 for the UEs. As another example, the hub 1014 may be a controller that sends commands or instructions to one or more actuators in the UEs. Commands or instructions may be received from the UEs, network nodes 1010, or by executable code, script, process, or other instructions in the hub 1014. As another example, the hub 1014 may be a data collector that acts as temporary storage for UE data and, in some embodiments, may perform analysis or other processing of the data. As another example, the hub 1014 may be a content source. For example, for a UE that is a VR headset, display, loudspeaker or other media delivery device, the hub 1014 may retrieve VR assets, video, audio, or other media or data related to sensory information via a network node, which the hub 1014 then provides to the UE either directly, after performing local processing, and/or after adding additional local content. In still another example, the hub 1014 acts as a proxy server or orchestrator for the UEs, in particular in if one or more of the UEs are low energy IoT devices.

The hub 1014 may have a constant/persistent or intermittent connection to the network node 1010*b*. The hub 1014 may also allow for a different communication scheme and/or schedule between the hub 1014 and UEs (e.g., UE 1012*c* and/or 1012*d*), and between the hub 1014 and the core network 1006. In other examples, the hub 1014 is connected to the core network 1006 and/or one or more UEs via a wired connection. Moreover, the hub 1014 may be configured to connect to an M2M service provider over the access network 1004 and/or to another UE over a direct connection. In some scenarios, UEs may establish a wireless connection with the network nodes 1010 while still connected via the hub 1014 via a wired or wireless connection. In some embodiments, the hub 1014 may be a dedicated hub—that is, a hub whose primary function is to route communications to/from the UEs from/to the network node 1010*b*. In other embodiments, the hub 1014 may be a non-dedicated hub—that is, a device which is capable of operating to route communications between the UEs and network node 1010*b*, but which is additionally capable of operating as a communication start and/or end point for certain data channels.

Figure 11:
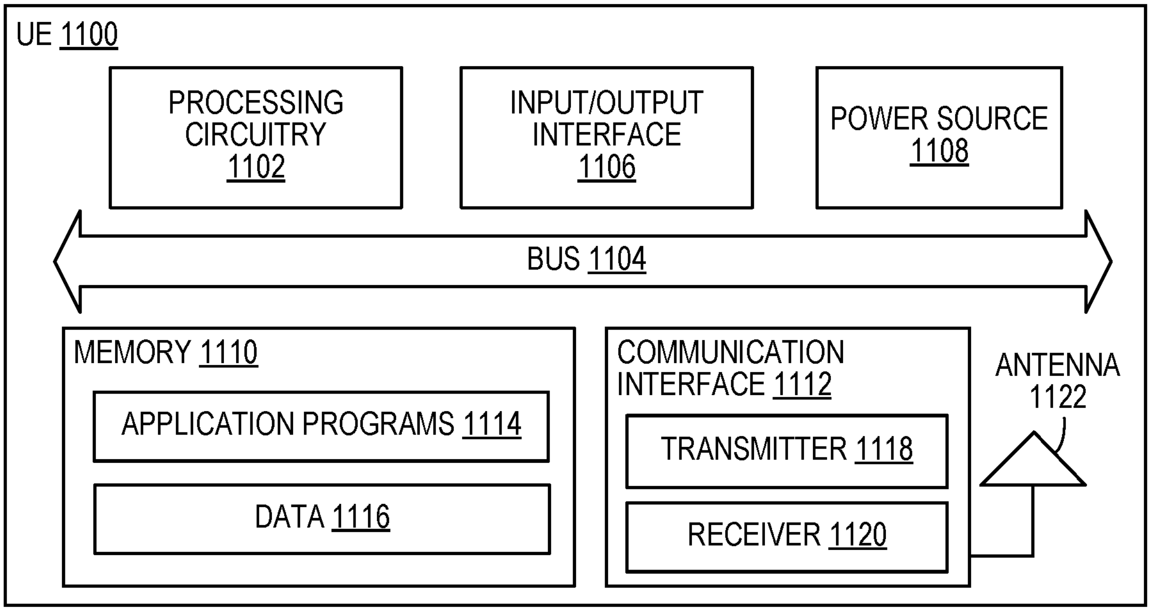
FIG. 11 shows a UE according to various embodiments of the present disclosure.

FIG. 11 shows a UE 1100 in accordance with some embodiments. As used herein, a UE refers to a device capable, configured, arranged and/or operable to communicate wirelessly with network nodes and/or other UEs. Examples of a UE include, but are not limited to, a smart phone, mobile phone, cell phone, voice over IP (VoIP) phone, wireless local loop phone, desktop computer, personal digital assistant (PDA), wireless cameras, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc. Other examples include any UE identified by the 3rd Generation Partnership Project (3GPP), including a narrow band internet of things (NB-IoT) UE, a machine type communication (MTC) UE, and/or an enhanced MTC (eMTC) UE.

A UE may support device-to-device (D2D) communication, for example by implementing a 3GPP standard for sidelink communication, Dedicated Short-Range Communication (DSRC), vehicle-to-vehicle (V2V), vehicle-to-infrastructure (V2I), or vehicle-to-everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE 1100 includes processing circuitry 1102 that is operatively coupled via a bus 1104 to an input/output interface 1106, a power source 1108, a memory 1110, a communication interface 1112, and/or any other component, or any combination thereof. Certain UEs may utilize all or a subset of the components shown in FIG. 11. The level of integration between the components may vary from one UE to another UE. Further, certain UEs may contain multiple instances of a component, such as multiple processors, memories, transceivers, transmitters, receivers, etc.

The processing circuitry 1102 is configured to process instructions and data and may be configured to implement any sequential state machine operative to execute instructions stored as machine-readable computer programs in the memory 1110. The processing circuitry 1102 may be implemented as one or more hardware-implemented state machines (e.g., in discrete logic, field-programmable gate arrays (FPGAs), application specific integrated circuits (ASICs), etc.); programmable logic together with appropriate firmware; one or more stored computer programs, general-purpose processors, such as a microprocessor or digital signal processor (DSP), together with appropriate software; or any combination of the above. For example, the processing circuitry 1102 may include multiple central processing units (CPUs).

In the example, the input/output interface 1106 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE 1100. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source 1108 is structured as a battery or battery pack. Other types of power sources, such as an external power source (e.g., an electricity outlet), photovoltaic device, or power cell, may be used. The power source 1108 may further include power circuitry for delivering power from the power source 1108 itself, and/or an external power source, to the various parts of the UE 1100 via input circuitry or an interface such as an electrical power cable. Delivering power may be, for example, for charging of the power source 1108. Power circuitry may perform any formatting, converting, or other modification to the power from the power source 1108 to make the power suitable for the respective components of the UE 1100 to which power is supplied.

The memory 1110 may be or be configured to include memory such as random access memory (RAM), read-only memory (ROM), programmable read-only memory (PROM), erasable programmable read-only memory (EPROM), electrically erasable programmable read-only memory (EEPROM), magnetic disks, optical disks, hard disks, removable cartridges, flash drives, and so forth. In one example, the memory 1110 includes one or more application programs 1114, such as an operating system, web browser application, a widget, gadget engine, or other application, and corresponding data 1116. The memory 1110 may store, for use by the UE 1100, any of a variety of various operating systems or combinations of operating systems.

The memory 1110 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a USIM and/or ISIM, other memory, or any combination thereof. The UICC may for example be an embedded UICC (eUICC), integrated UICC (iUICC) or a removable UICC commonly known as 'SIM card.' The memory 1110 may allow the UE 1100 to access instructions, application programs and the like, stored on transitory or non-transitory memory media, to off-load data, or to upload data. An article of manufacture, such as one utilizing a communication system may be tangibly embodied as or in the memory 1110, which may be or comprise a device-readable storage medium.

The processing circuitry 1102 may be configured to communicate with an access network or other network using the communication interface 1112. The communication interface 1112 may comprise one or more communication subsystems and may include or be communicatively coupled to an antenna 1122. The communication interface 1112 may include one or more transceivers used to communicate, such as by communicating with one or more remote transceivers of another device capable of wireless communication (e.g., another UE or a network node in an access network). Each transceiver may include a transmitter 1118 and/or a receiver 1120 appropriate to provide network communications (e.g., optical, electrical, frequency allocations, and so forth). Moreover, the transmitter 1118 and receiver 1120 may be coupled to one or more antennas (e.g., antenna 1122) and may share circuit components, software or firmware, or alternatively be implemented separately.

In the illustrated embodiment, communication functions of the communication interface 1112 may include cellular communication, Wi-Fi communication, LPWAN communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMax, Ethernet, transmission control protocol/internet protocol (TCP/IP), synchronous optical networking (SONET), Asynchronous Transfer Mode (ATM), QUIC, Hypertext Transfer Protocol (HTTP), and so forth.

Regardless of the type of sensor, a UE may provide an output of data captured by its sensors, through its communication interface 1112, via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., an alert is sent when moisture is detected), in response to a request (e.g., a user initiated request), or a continuous stream (e.g., a live video feed of a patient).

As another example, a UE comprises an actuator, a motor, or a switch, related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or to a robotic arm performing a medical procedure according to the received input.

A UE, when in the form of an Internet of Things (IoT) device, may be a device for use in one or more application domains, these domains comprising, but not limited to, city wearable technology, extended industrial application and healthcare. Non-limiting examples of such an IoT device are a device which is or which is embedded in: a connected refrigerator or freezer, a TV, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or Virtual Reality (VR), a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence of the intended application of the IoT device in addition to other components as described in relation to the UE 1100 shown in FIG. 11.

As yet another specific example, in an IoT scenario, a UE may represent a machine or other device that performs monitoring and/or measurements and transmits the results of such monitoring and/or measurements to another UE and/or a network node. The UE may in this case be an M2M device, which may in a 3GPP context be referred to as an MTC device. As one particular example, the UE may implement the 3GPP NB-IoT standard. In other scenarios, a UE may represent a vehicle, such as a car, a bus, a truck, a ship and an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g., by controlling an actuator) to increase or decrease the drone's speed. The first and/or the second UE can also include more than one of the functionalities described above. For example, a UE might comprise the sensor and the actuator, and handle communication of data for both the speed sensor and the actuators.

Figure 12:
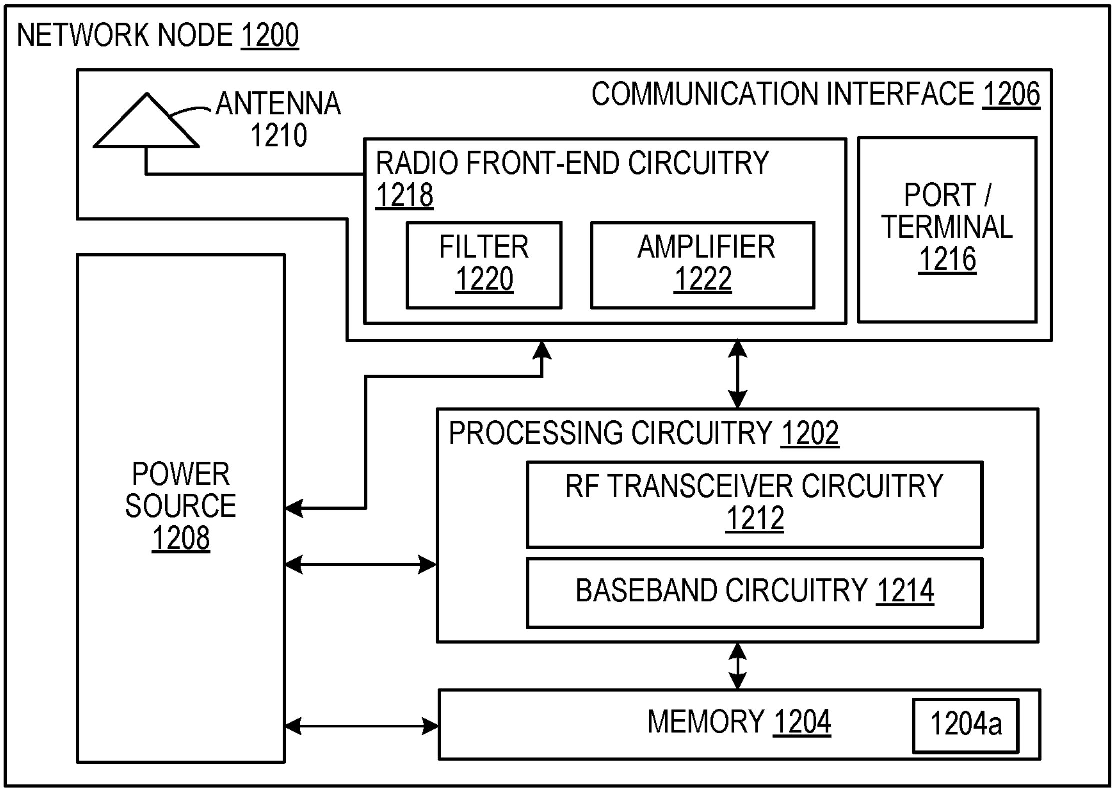
FIG. 12 shows a network node according to various embodiments of the present disclosure.

FIG. 12 shows a network node 1200 in accordance with some embodiments. As used herein, network node refers to equipment capable, configured, arranged and/or operable to communicate directly or indirectly with a UE and/or with other network nodes or equipment, in a telecommunication network. Examples of network nodes include, but are not limited to, access points (APs) (e.g., radio access points), base stations (BSs) (e.g., radio base stations, Node Bs, evolved Node Bs (eNBs) and NR NodeBs (gNBs)).

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs).

The network node 1200 includes a processing circuitry 1202, a memory 1204, a communication interface 1206, and a power source 1208. The network node 1200 may be composed of multiple physically separate components (e.g., a NodeB component and a RNC component, or a BTS component and a BSC component, etc.), which may each have their own respective components. In certain scenarios in which the network node 1200 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, the network node 1200 may be configured to support multiple radio access technologies (RATs). In such embodiments, some components may be duplicated (e.g., separate memory 1204 for different RATs) and some components may be reused (e.g., a same antenna 1210 may be shared by different RATs). The network node 1200 may also include multiple sets of the various illustrated components for different wireless technologies integrated into network node 1200, for example GSM, WCDMA, LTE, NR, WiFi, Zigbee, Z-wave, LoRaWAN, Radio Frequency Identification (RFID) or Bluetooth wireless technologies. These wireless technologies may be integrated into the same or different chip or set of chips and other components within network node 1200.

The processing circuitry 1202 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1200 components, such as the memory 1204, to provide network node 1200 functionality.

In some embodiments, the processing circuitry 1202 includes a system on a chip (SOC). In some embodiments, the processing circuitry 1202 includes one or more of radio frequency (RF) transceiver circuitry 1212 and baseband processing circuitry 1214. In some embodiments, the radio frequency (RF) transceiver circuitry 1212 and the baseband processing circuitry 1214 may be on separate chips (or sets of chips), boards, or units, such as radio units and digital units. In alternative embodiments, part or all of RF transceiver circuitry 1212 and baseband processing circuitry 1214 may be on the same chip or set of chips, boards, or units.

The memory 1204 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry 1202. The memory 1204 may store any suitable instructions, data, or information, including a computer program, software, an application including one or more of logic, rules, code, tables, and/or other instructions (collectively denoted as computer program product 1204*a*) capable of being executed by the processing circuitry 1202 and utilized by the network node 1200. The memory 1204 may be used to store any calculations made by the processing circuitry 1202 and/or any data received via the communication interface 1206. In some embodiments, the processing circuitry 1202 and memory 1204 is integrated.

The communication interface 1206 is used in wired or wireless communication of signaling and/or data between a network node, access network, and/or UE. As illustrated, the communication interface 1206 comprises port(s)/terminal(s) 1216 to send and receive data, for example to and from a network over a wired connection. The communication interface 1206 also includes radio front-end circuitry 1218 that may be coupled to, or in certain embodiments a part of, the antenna 1210. Radio front-end circuitry 1218 comprises filters 1220 and amplifiers 1222. The radio front-end circuitry 1218 may be connected to an antenna 1210 and processing circuitry 1202. The radio front-end circuitry may be configured to condition signals communicated between antenna 1210 and processing circuitry 1202. The radio front-end circuitry 1218 may receive digital data that is to be sent out to other network nodes or UEs via a wireless connection. The radio front-end circuitry 1218 may convert the digital data into a radio signal having the appropriate channel and bandwidth parameters using a combination of filters 1220 and/or amplifiers 1222. The radio signal may then be transmitted via the antenna 1210. Similarly, when receiving data, the antenna 1210 may collect radio signals which are then converted into digital data by the radio front-end circuitry 1218. The digital data may be passed to the processing circuitry 1202. In other embodiments, the communication interface may comprise different components and/or different combinations of components.

In certain alternative embodiments, the network node 1200 does not include separate radio front-end circuitry 1218, instead, the processing circuitry 1202 includes radio front-end circuitry and is connected to the antenna 1210. Similarly, in some embodiments, all or some of the RF transceiver circuitry 1212 is part of the communication interface 1206. In still other embodiments, the communication interface 1206 includes one or more ports or terminals 1216, the radio front-end circuitry 1218, and the RF transceiver circuitry 1212, as part of a radio unit (not shown), and the communication interface 1206 communicates with the baseband processing circuitry 1214, which is part of a digital unit (not shown).

The antenna 1210 may include one or more antennas, or antenna arrays, configured to send and/or receive wireless signals. The antenna 1210 may be coupled to the radio front-end circuitry 1218 and may be any type of antenna capable of transmitting and receiving data and/or signals wirelessly. In certain embodiments, the antenna 1210 is separate from the network node 1200 and connectable to the network node 1200 through an interface or port.

The antenna 1210, communication interface 1206, and/or the processing circuitry 1202 may be configured to perform any receiving operations and/or certain obtaining operations described herein as being performed by the network node. Any information, data and/or signals may be received from a UE, another network node and/or any other network equipment. Similarly, the antenna 1210, the communication interface 1206, and/or the processing circuitry 1202 may be configured to perform any transmitting operations described herein as being performed by the network node. Any information, data and/or signals may be transmitted to a UE, another network node and/or any other network equipment.

The power source 1208 provides power to the various components of network node 1200 in a form suitable for the respective components (e.g., at a voltage and current level needed for each respective component). The power source 1208 may further comprise, or be coupled to, power management circuitry to supply the components of the network node 1200 with power for performing the functionality described herein. For example, the network node 1200 may be connectable to an external power source (e.g., the power grid, an electricity outlet) via an input circuitry or interface such as an electrical cable, whereby the external power source supplies power to power circuitry of the power source 1208. As a further example, the power source 1208 may comprise a source of power in the form of a battery or battery pack which is connected to, or integrated in, power circuitry. The battery may provide backup power should the external power source fail.

Embodiments of the network node 1200 may include additional components beyond those shown in FIG. 12 for providing certain aspects of the network node's functionality, including any of the functionality described herein and/or any functionality necessary to support the subject matter described herein. For example, the network node 1200 may include user interface equipment to allow input of information into the network node 1200 and to allow output of information from the network node 1200. This may allow a user to perform diagnostic, maintenance, repair, and other administrative functions for the network node 1200.

Figure 13:
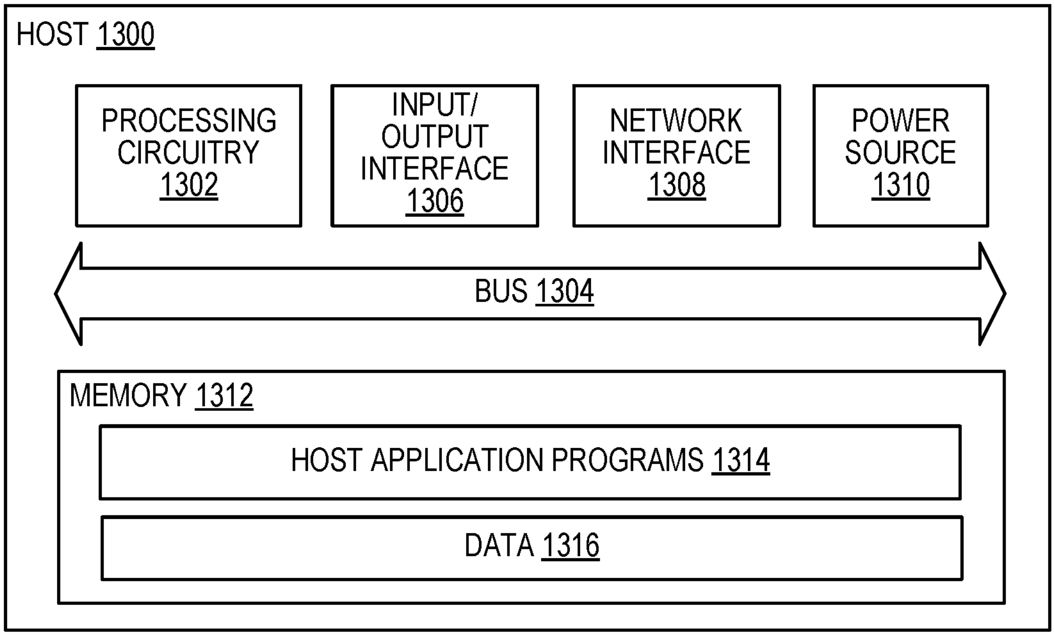
FIG. 13 shows host computing system according to various embodiments of the present disclosure.

FIG. 13 is a block diagram of a host 1300, which may be an embodiment of the host 1016 of FIG. 10, in accordance with various aspects described herein. As used herein, the host 1300 may be or comprise various combinations hardware and/or software, including a standalone server, a blade server, a cloud-implemented server, a distributed server, a virtual machine, container, or processing resources in a server farm. The host 1300 may provide one or more services to one or more UEs.

The host 1300 includes processing circuitry 1302 that is operatively coupled via a bus 1304 to an input/output interface 1306, a network interface 1308, a power source 1310, and a memory 1312. Other components may be included in other embodiments. Features of these components may be substantially similar to those described with respect to the devices of previous figures, such as FIGS. 11 and 12, such that the descriptions thereof are generally applicable to the corresponding components of host 1300.

The memory 1312 may include one or more computer programs including one or more host application programs 1314 and data 1316, which may include user data, e.g., data generated by a UE for the host 1300 or data generated by the host 1300 for a UE. Embodiments of the host 1300 may utilize only a subset or all of the components shown. The host application programs 1314 may be implemented in a container-based architecture and may provide support for video codecs (e.g., Versatile Video Coding (VVC), High Efficiency Video Coding (HEVC), Advanced Video Coding (AVC), MPEG, VP9) and audio codecs (e.g., FLAC, Advanced Audio Coding (AAC), MPEG, G.711), including transcoding for multiple different classes, types, or implementations of UEs (e.g., handsets, desktop computers, wearable display systems, heads-up display systems). The host application programs 1314 may also provide for user authentication and licensing checks and may periodically report health, routes, and content availability to a central node, such as a device in or on the edge of a core network. Accordingly, the host 1300 may select and/or indicate a different host for over-the-top services for a UE. The host application programs 1314 may support various protocols, such as the HTTP Live Streaming (HLS) protocol, Real-Time Messaging Protocol (RTMP), Real-Time Streaming Protocol (RTSP), Dynamic Adaptive Streaming over HTTP (MPEG-DASH), etc.

Figure 14:
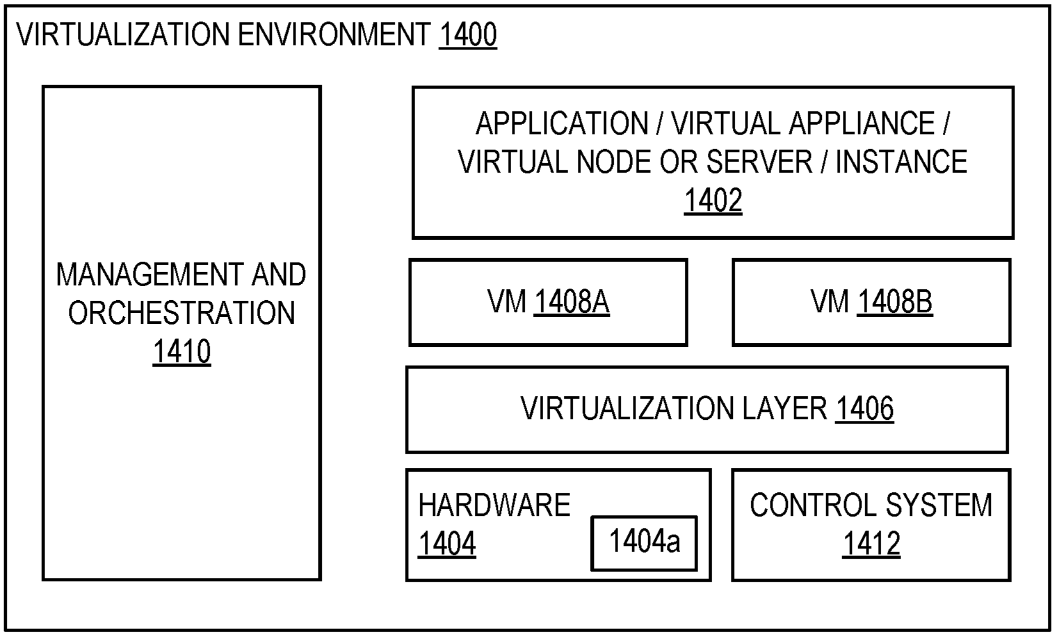
FIG. 14 is a block diagram of a virtualization environment in which functions implemented by some embodiments of the present disclosure may be virtualized.

FIG. 14 is a block diagram illustrating a virtualization environment 1400 in which functions implemented by some embodiments may be virtualized. In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments 1400 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized.

Applications 1402 (which may alternatively be called software instances, virtual appliances, network functions, virtual nodes, virtual network functions, etc.) are run in the virtualization environment 1400 to implement some of the features, functions, and/or benefits of some of the embodiments disclosed herein.

Hardware 1404 includes processing circuitry, memory that stores software and/or instructions (collectively denoted as computer program product 1404*a*) executable by hardware processing circuitry, and/or other hardware devices as described herein, such as a network interface, input/output interface, and so forth. Software may be executed by the processing circuitry to instantiate one or more virtualization layers 1406 (also referred to as hypervisors or virtual machine monitors (VMMs)), provide VMs 1408*a* and 1408*b* (one or more of which may be generally referred to as VMs 1408), and/or perform any of the functions, features and/or benefits described in relation with some embodiments described herein. The virtualization layer 1406 may present a virtual operating platform that appears like networking hardware to the VMs 1408.

The VMs 1408 comprise virtual processing, virtual memory, virtual networking or interface and virtual storage, and may be run by a corresponding virtualization layer 1406. Different embodiments of the instance of a virtual appliance 1402 may be implemented on one or more of VMs 1408, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a VM 1408 may be a software implementation of a physical machine that runs programs as if they were executing on a physical, non-virtualized machine. Each of the VMs 1408, and that part of hardware 1404 that executes that VM, be it hardware dedicated to that VM and/or hardware shared by that VM with others of the VMs, forms separate virtual network elements. Still in the context of NFV, a virtual network function is responsible for handling specific network functions that run in one or more VMs 1408 on top of the hardware 1404 and corresponds to the application 1402.

Hardware 1404 may be implemented in a standalone network node with generic or specific components. Hardware 1404 may implement some functions via virtualization. Alternatively, hardware 1404 may be part of a larger cluster of hardware (e.g., such as in a data center or CPE) where many hardware nodes work together and are managed via management and orchestration 1410, which, among others, oversees lifecycle management of applications 1402. In some embodiments, hardware 1404 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signaling can be provided with the use of a control system 1412 which may alternatively be used for communication between hardware nodes and radio units.

Figure 15:
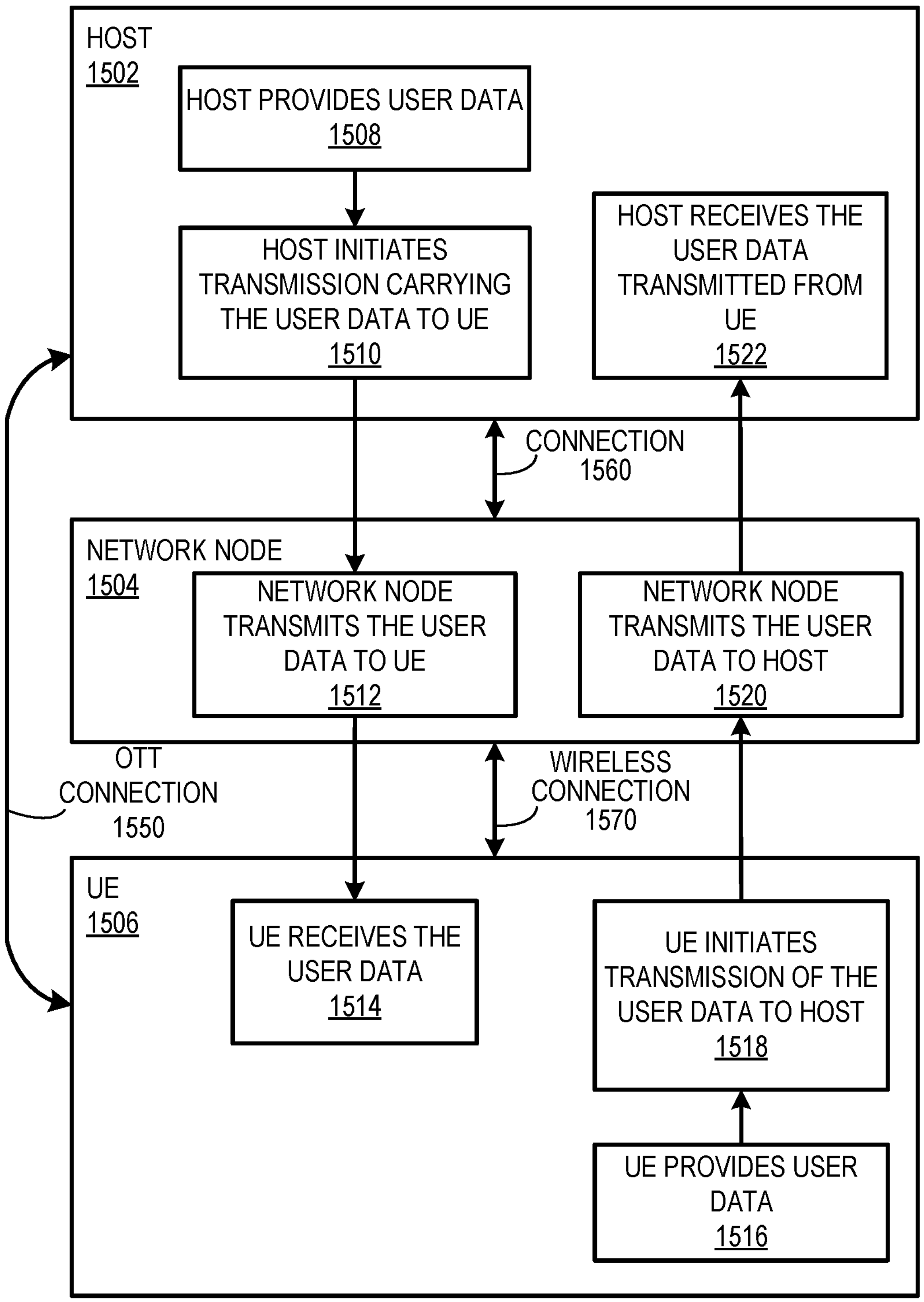
FIG. 15 illustrates communication between a host computing system, a network node, and a UE via multiple connections, at least one of which is wireless, according to various embodiments of the present disclosure.

FIG. 15 shows a communication diagram of a host 1502 communicating via a network node 1504 with a UE 1506 over a partially wireless connection in accordance with some embodiments. Example implementations, in accordance with various embodiments, of the UE (such as a UE 1012*a* of FIG. 10 and/or UE 1100 of FIG. 11), network node (such as network node 1010*a* of FIG. 10 and/or network node 1200 of FIG. 12), and host (such as host 1016 of FIG. 10 and/or host 1300 of FIG. 13) discussed in the preceding paragraphs will now be described with reference to FIG. 15.

Like host 1300, embodiments of host 1502 include hardware, such as a communication interface, processing circuitry, and memory. The host 1502 also includes software, which is stored in or accessible by the host 1502 and executable by the processing circuitry. The software includes a host application that may be operable to provide a service to a remote user, such as the UE 1506 connecting via an over-the-top (OTT) connection 1550 extending between the UE 1506 and host 1502. In providing the service to the remote user, a host application may provide user data which is transmitted using the OTT connection 1550.

The network node 1504 includes hardware enabling it to communicate with the host 1502 and UE 1506. The connection 1560 may be direct or pass through a core network (like core network 1006 of FIG. 10) and/or one or more other intermediate networks, such as one or more public, private, or hosted networks. For example, an intermediate network may be a backbone network or the Internet.

The UE 1506 includes hardware and software, which is stored in or accessible by UE 1506 and executable by the UE's processing circuitry. The software includes a client application, such as a web browser or operator-specific "app" that may be operable to provide a service to a human or non-human user via UE 1506 with the support of the host 1502. In the host 1502, an executing host application may communicate with the executing client application via the OTT connection 1550 terminating at the UE 1506 and host 1502. In providing the service to the user, the UE's client application may receive request data from the host's host application and provide user data in response to the request data. The OTT connection 1550 may transfer both the request data and the user data. The UE's client application may interact with the user to generate the user data that it provides to the host application through the OTT connection 1550.

The OTT connection 1550 may extend via a connection 1560 between the host 1502 and the network node 1504 and via a wireless connection 1570 between the network node 1504 and the UE 1506 to provide the connection between the host 1502 and the UE 1506. The connection 1560 and wireless connection 1570, over which the OTT connection 1550 may be provided, have been drawn abstractly to illustrate the communication between the host 1502 and the UE 1506 via the network node 1504, without explicit reference to any intermediary devices and the precise routing of messages via these devices.

As an example of transmitting data via the OTT connection 1550, in step 1508, the host 1502 provides user data, which may be performed by executing a host application. In some embodiments, the user data is associated with a particular human user interacting with the UE 1506. In other embodiments, the user data is associated with a UE 1506 that shares data with the host 1502 without explicit human interaction. In step 1510, the host 1502 initiates a transmission carrying the user data towards the UE 1506. The host 1502 may initiate the transmission responsive to a request transmitted by the UE 1506. The request may be caused by human interaction with the UE 1506 or by operation of the client application executing on the UE 1506. The transmission may pass via the network node 1504, in accordance with the teachings of the embodiments described throughout this disclosure. Accordingly, in step 1512, the network node 1504 transmits to the UE 1506 the user data that was carried in the transmission that the host 1502 initiated, in accordance with the teachings of the embodiments described throughout this disclosure. In step 1514, the UE 1506 receives the user data carried in the transmission, which may be performed by a client application executed on the UE 1506 associated with the host application executed by the host 1502.

In some examples, the UE 1506 executes a client application which provides user data to the host 1502. The user data may be provided in reaction or response to the data received from the host 1502. Accordingly, in step 1516, the UE 1506 may provide user data, which may be performed by executing the client application. In providing the user data, the client application may further consider user input received from the user via an input/output interface of the UE 1506. Regardless of the specific manner in which the user data was provided, the UE 1506 initiates, in step 1518, transmission of the user data towards the host 1502 via the network node 1504. In step 1520, in accordance with the teachings of the embodiments described throughout this disclosure, the network node 1504 receives user data from the UE 1506 and initiates transmission of the received user data towards the host 1502. In step 1522, the host 1502 receives the user data carried in the transmission initiated by the UE 1506.

One or more of the various embodiments improve the performance of OTT services provided to the UE 1506 using the OTT connection 1550, in which the wireless connection 1570 forms the last segment. More precisely, embodiments can facilitate proprietary enhancements to channel information compression by UE vendors and/or UE chipset vendors, as well as proprietary enhancements to channel information decompression by network. At the same time, embodiments can provide a standardized, ML-based CSI reporting solution that can work in a multi-vendor 3GPP system. At a high level, embodiments can include desirable aspects of both proprietary and standardized approaches while avoiding and/or reducing the undesirable aspects of both approaches. Due to these advantages, embodiments can improve the overall performance of MU-MIMO used to transmit DL data to multiple UEs concurrently. Accordingly, this can increase data rates, reduce data latency, and/or increase the number of concurrent users supported by the network, thereby increasing the value of OTT services that rely on the network to both end users and service providers.

In an example scenario, factory status information may be collected and analyzed by the host 1502. As another example, the host 1502 may process audio and video data which may have been retrieved from a UE for use in creating maps. As another example, the host 1502 may collect and analyze real-time data to assist in controlling vehicle congestion (e.g., controlling traffic lights). As another example, the host 1502 may store surveillance video uploaded by a UE. As another example, the host 1502 may store or control access to media content such as video, audio, VR or AR which it can broadcast, multicast or unicast to UEs. As other examples, the host 1502 may be used for energy pricing, remote control of non-time critical electrical load to balance power generation needs, location services, presentation services (such as compiling diagrams etc. from data collected from remote devices), or any other function of collecting, retrieving, storing, analyzing and/or transmitting data.

In some examples, a measurement procedure may be provided for the purpose of monitoring data rate, latency and other factors on which the one or more embodiments improve. There may further be an optional network functionality for reconfiguring the OTT connection 1550 between the host 1502 and UE 1506, in response to variations in the measurement results. The measurement procedure and/or the network functionality for reconfiguring the OTT connection may be implemented in software and hardware of the host 1502 and/or UE 1506. In some embodiments, sensors (not shown) may be deployed in or in association with other devices through which the OTT connection 1550 passes; the sensors may participate in the measurement procedure by supplying values of the monitored quantities exemplified above or by supplying values of other physical quantities from which software may compute or estimate the monitored quantities. The reconfiguring of the OTT connection 1550 may include message format, retransmission settings, preferred routing etc.; the reconfiguring need not directly alter the operation of the network node 1504. Such procedures and functionalities may be known and practiced in the art. In certain embodiments, measurements may involve proprietary UE signaling that facilitates measurements of throughput, propagation times, latency and the like, by the host 1502. The measurements may be implemented in that software causes messages to be transmitted, in particular empty or 'dummy' messages, using the OTT connection 1550 while monitoring propagation times, errors, etc.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification and drawings, can be used synonymously in certain instances (e.g., "data" and "information"). It should be understood, that although these terms (and/or other terms that can be synonymous to one another) can be used synonymously herein, there can be instances when such words can be intended to not be used synonymously.

Embodiments of the present disclosure also include, but are not limited to, the following enumerated examples:

A1. A method for a radio access network (RAN) node configured to serve one or more user equipment (UEs) in the RAN, the method comprising:

transmitting reference signals (RS) for a downlink (DL) channel;

receiving, from a UE, a report including encoded feedback representing the DL channel, wherein the feedback comprises:

a UE DL channel estimate mapped to a channel feature set based on a first mapping that is unknown to the RAN node; and the channel feature set compressed based on a second mapping that is known to the RAN node; and using a decoder function of a neural-network autoencoder (NNAE), decoding the encoded feedback to obtain a reconstruction of the channel feature set.

A2. The method of embodiment A1, wherein the second mapping is one of a plurality of available second mappings and the method further comprises one of the following:

sending, to the UE, a first indication of a RAN node selection of the second mapping; or receiving, from the UE, a first indication of a UE selection of the second mapping.

A3. The method of embodiment A2, further comprising receiving, from the UE, a further indication of the plurality of available second mappings, wherein the first indication of the RAN node selection is sent in response to the further indication.

A4. The method of any of embodiments A2-A3, wherein the plurality of available second mappings differ with respect to one or more of the following: UE mobility, number of antennas and/or RS ports used by the UE, beamforming of RS ports by the UE, UE antenna configuration.

A5. The method of any of embodiments A1-A4, further comprising sending, to the UE, a second indication of whether the first mapping is enabled or disabled.

A6. The method of embodiment A5, wherein when the second indication indicates that the first mapping is disabled, the UE DL channel estimate is mapped to the first channel feature set based on a default mapping that is known to the RAN node.

A7. The method of any of embodiments A1-A6, wherein the decoder function is unknown to the UE.

A8. The method of any of embodiments A1-A7, further comprising training the decoder function based on the second mapping and a loss function that is unknown to the UE.

A9. The method of any of embodiments A1-A8, wherein the channel feature set comprises one or more of the following: Doppler power spectrum of the DL channel, and dominant delays of DL channel.

A10. The method of any of embodiments A1-A8, wherein the channel feature set comprises a representation of a subspace of a plurality of Discrete Fourier Transform (DFT) vectors that correspond to a respective plurality of beams transmitted by the RAN node.

A11. The method of embodiment A10, wherein subspace includes one the following:

a normalized 2L-dimensional projection of the UE DL channel estimate onto a beam space represented by the DFT vectors; or a normalized 2LM-dimensional projection of the UE DL channel estimate onto the beam space represented by the DFT vectors, with frequency domain compression.

A12. The method of embodiment A11, where the representation of the subspace comprises at least one of the following:

indices of the DFT vectors included in the normalized 2L- or 2LM-dimensional projection; and Frobenius norm of the subspace.

A13. The method of any of embodiments A11-A12, wherein at least one of L and M is configurable by the RAN node.

A14. The method of any of embodiments A10-A11, wherein the representation of the subspace comprises one or more of the following: Doppler power spectrum of the subspace, and dominant delays of the subspace.

A15. The method of any of embodiments A1-A14, wherein the second mapping is an encoder function of the NNAE.

B1. A method for a user equipment (UE) configured to communicate with a radio access network (RAN), the method comprising:

determining a downlink (DL) channel estimate based on UE measurements of DL reference signals (RS) transmitted by the RAN node;

mapping the DL channel estimate to a channel feature set based on a first mapping that is unknown to the RAN node;

compressing the channel feature set based on a second mapping that is known to the RAN node; and sending, to the RAN node, a report including the compressed channel feature set.

B2. The method of embodiment B1, wherein the second mapping is one of a plurality of available second mappings and the method further comprises one of the following:

receiving, from the RAN node, a first indication of a RAN node selection of the second mapping; or sending, to the RAN node, a first indication of a UE selection of the second mapping.

B3. The method of embodiment B2, further comprising sending, to the RAN node, a further indication of the plurality of available second mappings, wherein the first indication of the RAN node selection is received in response to the further indication.

B4. The method of any of embodiments B2-B3, wherein the plurality of available second mappings differ with respect to one or more of the following: UE mobility, number of antennas and/or RS ports used by the UE, beamforming of RS ports by the UE, UE antenna configuration.

B5. The method of any of embodiments B1-B4, further comprising receiving, from the RAN node, a second indication of whether the first mapping is enabled or disabled.

B6. The method of embodiment B5, wherein:

mapping the DL channel estimate to the channel feature set based on the first mapping is responsive to the second indication indicating that the first mapping is enabled; and the method further comprises, when the second indication indicates that the first mapping is disabled, mapping the DL channel estimate to the channel feature set based on a default mapping that is known to the RAN node.

B7. The method of any of embodiments B1-B6, wherein the second mapping is an encoder function of a neural-network autoencoder (NNAE).

B8. The method of embodiment B7, wherein the decoder function of the NNAE is unknown to the UE.

B9. The method of any of embodiments B7-B8, further comprising training the encoder function based on a loss function that is unknown to the RAN node.

B10. The method of any of embodiments B1-B9, wherein the channel feature set comprises one or more of the following: Doppler power spectrum of the DL channel, and dominant delays of the DL channel.

B11. The method of any of embodiments B1-B9, wherein the channel feature set comprises a representation of a subspace of a plurality of Discrete Fourier Transform (DFT) vectors that correspond to a respective plurality of beams transmitted by the RAN node.

B12. The method of embodiment B11, wherein subspace includes one the following:

a normalized 2L-dimensional projection of the UE DL channel estimate onto a beam space represented by the DFT vectors; or a normalized 2LM-dimensional projection of the UE DL channel estimate onto the beam space represented by the DFT vectors, with frequency domain compression.

B13. The method of embodiment B12, where the representation of the subspace comprises at least one of the following:

indices of the DFT vectors included in the normalized 2L- or 2LM-dimensional projection; and Frobenius norm of the subspace.

B14. The method of any of embodiments B12-B13, wherein at least one of L and M is configurable by the RAN node.

B15. The method of any of embodiments B11-B12, wherein the representation of the subspace comprises one or more of the following: Doppler power spectrum of the subspace, and dominant delays of the subspace.

C1. A radio access network (RAN) node configured to serve one or more user equipment (UEs) in the RAN, the RAN node comprising:

communication interface circuitry configured to communicate with the UEs; and processing circuitry operatively coupled to the communication interface circuitry, whereby the processing circuitry and the communication interface circuitry are configured to perform operations corresponding to any of the methods of embodiments A1-A15.

C2. A radio access network (RAN) node configured to serve one or more user equipment (UEs) in the RAN, the RAN node being configured to perform operations corresponding to any of the methods of embodiments A1-A15.

C3. A non-transitory, computer-readable medium storing computer-executable instructions that, when executed by processing circuitry of a radio access network (RAN) node configured to serve one or more user equipment (UEs) in the RAN, configure the RAN node to perform operations corresponding to any of the methods of embodiments A1-A15.

C4. A computer program product comprising computer-executable instructions that, when executed by processing circuitry of a radio access network (RAN) node configured to serve one or more user equipment (UEs) in the RAN, configure the RAN node to perform operations corresponding to any of the methods of embodiments A1-A15.

D1. A user equipment (UE) configured to communicate with a radio access network (RAN), the UE comprising: communication interface circuitry configured to communicate with a RAN node; and processing circuitry operatively coupled to the communication interface circuitry, whereby the processing circuitry and the communication interface circuitry are configured to perform operations corresponding to any of the methods of embodiments B1-B15.

D2. A user equipment (UE) configured to communicate with a radio access network (RAN), the UE being further configured to perform operations corresponding to any of the methods of embodiments B1-B15.

D3. A non-transitory, computer-readable medium storing computer-executable instructions that, when executed by processing circuitry of a user equipment (UE) configured to communicate with a radio access network (RAN), configure the UE to perform operations corresponding to any of the methods of embodiments B1-B15.

D4. A computer program product comprising computer-executable instructions that, when executed by processing circuitry of a user equipment (UE) configured to communicate with a radio access network (RAN), configure the UE to perform operations corresponding to any of the methods of embodiments B1-B15.

The invention claimed is:

1. A method for a radio access network (RAN) node configured to serve one or more user equipment (UEs), the method comprising:

transmitting reference signals (RS) for a downlink (DL) channel;

receiving, from a UE, a report including encoded feedback representing the DL channel, wherein:

the encoded feedback comprises a UE DL channel estimate mapped to a channel feature set based on a first mapping that is proprietary to the UE; and the channel feature set is compressed based on a second mapping that is known by the UE and the RAN node; and using a decoder function of a neural network autoencoder (NNAE), decoding the encoded feedback to obtain a reconstruction of the channel feature set.

2. The method of claim 1, wherein:

the second mapping is one of a plurality of available second mappings; and the plurality of available second mappings differ from each other with respect to one or more of the following: UE mobility, number of RS ports used by the UE, beamforming of RS ports by the UE, number of antennas used by the UE, and UE antenna configuration.

3. The method of claim 2, further comprising:

receiving, from the UE, a further indication of the plurality of available second mappings;

selecting the second mapping from the plurality of available second mappings; and sending, to the UE, a first indication of the selected second mapping.

4. The method of claim 2, further comprising receiving, from the UE, a first indication of a UE selection of the second mapping from the plurality of available second mappings.

5. The method of claim 1, further comprising sending to the UE a second indication of whether the first mapping is enabled or disabled, wherein when the second indication indicates that the first mapping is disabled, the UE DL channel estimate is mapped to the channel feature set based on a default mapping that is known by the UE and the RAN node.

6. The method of claim 1, wherein the second mapping is an encoder function of the NNAE and one or more of the following applies:

the decoder function of the NNAE is proprietary to the RAN node; and the method further comprises training the decoder function based on the second mapping and on a loss function that is proprietary to the RAN node.

7. The method of claim 1, wherein the channel feature set comprises one or more of the following: Doppler power spectrum of the DL channel, and dominant delays of DL channel.

8. The method of claim 1, wherein the channel feature set comprises one or more of the following representations of a subspace of a plurality of Discrete Fourier Transform (DFT) vectors that correspond to a respective plurality of beams transmitted by the RAN node: Doppler power spectrum of the subspace, and dominant delays of the subspace.

9. The method of claim 1, further comprising performing a multi-user MIMO DL transmission using a precoder selected based on the reconstruction of the channel feature set.

10. A method for a user equipment (UE) configured to communicate with a radio access network (RAN) node, the method comprising:

determining a downlink (DL) channel estimate based on UE measurements of DL reference signals (RS) transmitted by the RAN node;

mapping the DL channel estimate to a channel feature set based on a first mapping that is proprietary to the UE;

compressing the channel feature set based on a second mapping that is known by the UE and the RAN node; and sending, to the RAN node, a report including encoded feedback representing the DL channel, wherein the encoded feedback includes the compressed channel feature set.

11. The method of claim 10, wherein:

the second mapping is one of a plurality of available second mappings; and the plurality of available second mappings differ from each other with respect to one or more of the following: UE mobility, number of RS ports used by the UE, beamforming of RS ports by the UE, number of antennas used by the UE, and UE antenna configuration.

12. The method of claim 11, further comprising:

sending, to the RAN node a further indication of the plurality of available second mappings; and receiving, from the RAN node, a first indication of a RAN node selection of the second mapping.

13. The method of claim 11, further comprising:

selecting the second mapping from the plurality of available second mappings; and sending, to the RAN node, a first indication of the selected second mapping.

14. The method of claim 10, further comprising receiving, from the RAN node, a second indication of whether the first mapping is enabled or disabled, wherein:

mapping the DL channel estimate to the channel feature set based on the first mapping is performed when the second indication indicates that the first mapping is enabled; and the method further comprises, when the second indication indicates that the first mapping is disabled, mapping the DL channel estimate to the channel feature set based on a default mapping that is known by the UE and the RAN node.

15. The method of claim 10, wherein the second mapping is an encoder function of a neural network autoencoder (NNAE) and one or more of the following applies:

the decoder function of the NNAE is proprietary to the RAN node; and the method further comprises training the encoder function based on a loss function that is proprietary to the UE.

16. The method of claim 10, wherein the channel feature set comprises one or more of the following: Doppler power spectrum of the DL channel, and dominant delays of the DL channel.

17. The method of claim 10, wherein the channel feature set comprises one or more of the following representation of a subspace of a plurality of Discrete Fourier Transform (DFT) vectors that correspond to a respective plurality of beams transmitted by the RAN node: Doppler power spectrum of the subspace, and dominant delays of the subspace.

18. The method of claim 10, wherein:

determining the DL channel estimate is based on receiving the DL RS via a plurality of UE antennas; and the method further comprises receiving, from the RAN node via the plurality of UE antennas, a multi-user MIMO DL transmission that was pre-coded based on a reconstruction of the channel feature set.

19. A radio access network (RAN) node configured to serve one or more user equipment (UEs), the RAN node comprising:

communication interface circuitry configured to communicate with the UEs; and processing circuitry operatively coupled to the communication interface circuitry, wherein the processing circuitry and the communication interface circuitry are configured to perform operations corresponding to the method of claim 1.

20. A user equipment (UE) configured to communicate with a radio access network (RAN) node, the UE comprising:

communication interface circuitry configured to communicate with the RAN node; and processing circuitry operatively coupled to the communication interface circuitry, wherein the processing circuitry and the communication interface circuitry are configured to perform operations corresponding to the method of claim 10.

* * * * *